US012657157B2

(12) United States Patent
Van Dyck et al.

(10) Patent No.: US 12,657,157 B2
(45) Date of Patent: **\*Jun. 16, 2026**

(54) EXTENDING AN EXPIRATION TIME OF AN OBJECT ASSOCIATED WITH AN ARCHIVE

(71) Applicant: Cohesity, Inc., San Jose, CA (US)

(72) Inventors: Dane Van Dyck, Atlanta, GA (US); Praveen Kumar Yarlagadda, Santa Clara, CA (US)

(73) Assignee: Cohesity, Inc., Santa Clara, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/932,852

(22) Filed: Oct. 31, 2024

(65) Prior Publication Data

US 2025/0053539 A1     Feb. 13, 2025

Related U.S. Application Data

(63) Continuation of application No. 17/589,116, filed on Jan. 31, 2022, now Pat. No. 12,158,859.

(51) Int. Cl.
| | |
|---|---|
| *G06F 16/11* | (2019.01) |
| *G06F 12/02* | (2006.01) |
| *G06F 16/174* | (2019.01) |

(52) U.S. Cl.
CPC ........ *G06F 16/113* (2019.01); *G06F 12/0253* (2013.01); *G06F 16/1752* (2019.01)

(58) Field of Classification Search
CPC .............. G06F 11/1451; G06F 16/125; G06F 16/1752; G06F 16/113; G06F 16/122; G06F 12/0253
See application file for complete search history.

(56) References Cited

U.S. PATENT DOCUMENTS

| | | |
|---|---|---|
| 7,293,027 B2 | 11/2007 | Margolus |
| 7,590,807 B2 | 9/2009 | McGovern |
| 9,166,989 B2 | 10/2015 | Huang |
| 9,323,760 B1 | 4/2016 | Chopra et al. |
| 10,140,303 B1 | 11/2018 | Patterson |
| 10,228,958 B1 | 3/2019 | Rustad et al. |

(Continued)

OTHER PUBLICATIONS

Bill Tolson, Cloud Archiving and Immutability; Azure offers WORM, Archive360.com, Sep. 20, 2018, https://www.archive360.com/blog/cloud-archiving-and-immutability-azu.

(Continued)

*Primary Examiner* — Cheyne D Ly
(74) *Attorney, Agent, or Firm* — Shumaker & Sieffert, P.A.

(57) ABSTRACT

An amount of expiration time extension for one or more objects associated with a first archive of a first snapshot of a source storage is determined based at least in part on a second data management policy associated with a second archive and one or more dynamically determined metrics. The first archive that includes the one or more objects is caused to be stored to a remote storage. At least a portion of content of the first archive is referenced by data chunks stored in a first chunk object of the remote storage and the first archive is associated with a first data management policy. Based on the determined amount of expiration time extension, an expiration time for the one or more objects associated with the first archive is stored in an archive metadata of the one or more objects associated with the first archive.

12 Claims, 20 Drawing Sheets

300

(56)                References Cited

U.S. PATENT DOCUMENTS

| | | | |
|---|---|---|---|
| 10,235,417 B1 | 3/2019 | Sterin et al. | |
| 10,528,521 B2 | 1/2020 | Agarwal et al. | |
| 11,086,545 B1 | 8/2021 | Dayal | |
| 11,748,299 B2 | 9/2023 | Yarlagadda et al. | |
| 2005/0055519 A1 | 3/2005 | Stuart et al. | |
| 2005/0138640 A1 | 6/2005 | Fresko | |
| 2005/0257400 A1 | 11/2005 | Sommerer et al. | |
| 2006/0143251 A1 | 6/2006 | Peterson et al. | |
| 2008/0263108 A1 | 10/2008 | Herbst et al. | |
| 2009/0125675 A1 | 5/2009 | Tsuboki et al. | |
| 2010/0036872 A1* | 2/2010 | Hiraiwa | G06F 16/164 |
| | | | 707/E17.055 |
| 2011/0231374 A1 | 9/2011 | Jain et al. | |
| 2011/0238935 A1 | 9/2011 | Meehan | |
| 2012/0117029 A1 | 5/2012 | Gold | |
| 2013/0080395 A1 | 3/2013 | Gong | |
| 2013/0159648 A1 | 6/2013 | Anglin et al. | |
| 2015/0066873 A1 | 3/2015 | Voruganti | |
| 2017/0017646 A1* | 1/2017 | Kumar | G06F 21/00 |
| 2017/0169038 A1 | 6/2017 | Borate et al. | |
| 2017/0212915 A1 | 7/2017 | Borate et al. | |
| 2018/0267710 A1 | 9/2018 | Deshpande et al. | |
| 2019/0340261 A1 | 11/2019 | Jain et al. | |
| 2020/0250083 A1 | 8/2020 | Shilane et al. | |
| 2020/0410135 A1 | 12/2020 | Macey et al. | |
| 2021/0042263 A1 | 2/2021 | Zdornov et al. | |
| 2021/0072928 A1 | 3/2021 | Winarski | |
| 2021/0124648 A1 | 4/2021 | Srinivasan et al. | |
| 2021/0141698 A1 | 5/2021 | Bourgeois et al. | |
| 2021/0294774 A1 | 9/2021 | Keller et al. | |
| 2022/0066670 A1 | 3/2022 | Naik et al. | |
| 2022/0083514 A1 | 3/2022 | Rath et al. | |
| 2022/0100652 A1 | 3/2022 | Liu et al. | |
| 2022/0121529 A1 | 4/2022 | Rath et al. | |
| 2022/0222074 A1* | 7/2022 | Rath | G06F 11/0757 |
| 2022/0382652 A1 | 12/2022 | Yadav et al. | |
| 2022/0413968 A1 | 12/2022 | Yeger et al. | |
| 2023/0029616 A1 | 2/2023 | Pandit et al. | |
| 2023/0032714 A1 | 2/2023 | Pandit et al. | |
| 2023/0077938 A1 | 3/2023 | Yarlagadda et al. | |
| 2023/0103474 A1 | 4/2023 | Gunda et al. | |
| 2023/0147671 A1 | 5/2023 | Narulkar | |
| 2023/0244633 A1 | 8/2023 | Van Dyck et al. | |
| 2023/0273897 A1 | 8/2023 | Van Dyck et al. | |
| 2023/0359586 A1 | 11/2023 | Yarlagadda et al. | |
| 2024/0103978 A1 | 3/2024 | Madan et al. | |
| 2024/0202162 A1 | 6/2024 | Elango et al. | |
| 2024/0311342 A1 | 9/2024 | Shankar et al. | |

OTHER PUBLICATIONS

Cohesity, "Architecture Matters Cohesity vs Dell EMC PowerScale (previously Dell EMC Isilon) NAS Scale-Out Limits", Cohesity, Sep. 2021, 11 pp., Retrieved from the Internet on Aug. 4, 2023 from URL: https://www.cohesity.com/resource-assets/white-paper/architecture-matters.pdf.

Cohesity, "Cohesity SpanFS and SnapTree", Cohesity, Sep. 2019, 11 pp., Retrieved from the Internet on Aug. 4, 2023 from URL: https://www.cohesity.com/resource-assets/white-paper/Cohesity-SpanFS-and-SnapTree-WP.pdf.

Ju-Lien Lim, Protecting Backup Archives with WORM and Tape Retention Lock, AWS Storage Blog, Aug. 19, 2020, https://aws.amazon.com/blogs/storage/protecting-archives-with-worm-an/.

Prosecution History from U.S. Appl. No. 17/589,116, dated Jul. 21, 2023 through Nov. 4, 2024, 94 pp.

Simha et al., "A Scalable Deduplication and Garbage Collection Engine for Incremental Backup", Association for Computing Machinery, Jun. 30, 2013, 12 pp.

VMware Customer Connect, "Cohesity Platform for Data Protection of VMware Cloud on AWS (80830)", Sep. 18, 2020, 10 pp., Retrieved from the Internet on Oct. 10, 2023 from URL: https://kb.vmware.com/s/article/80830#.

* cited by examiner

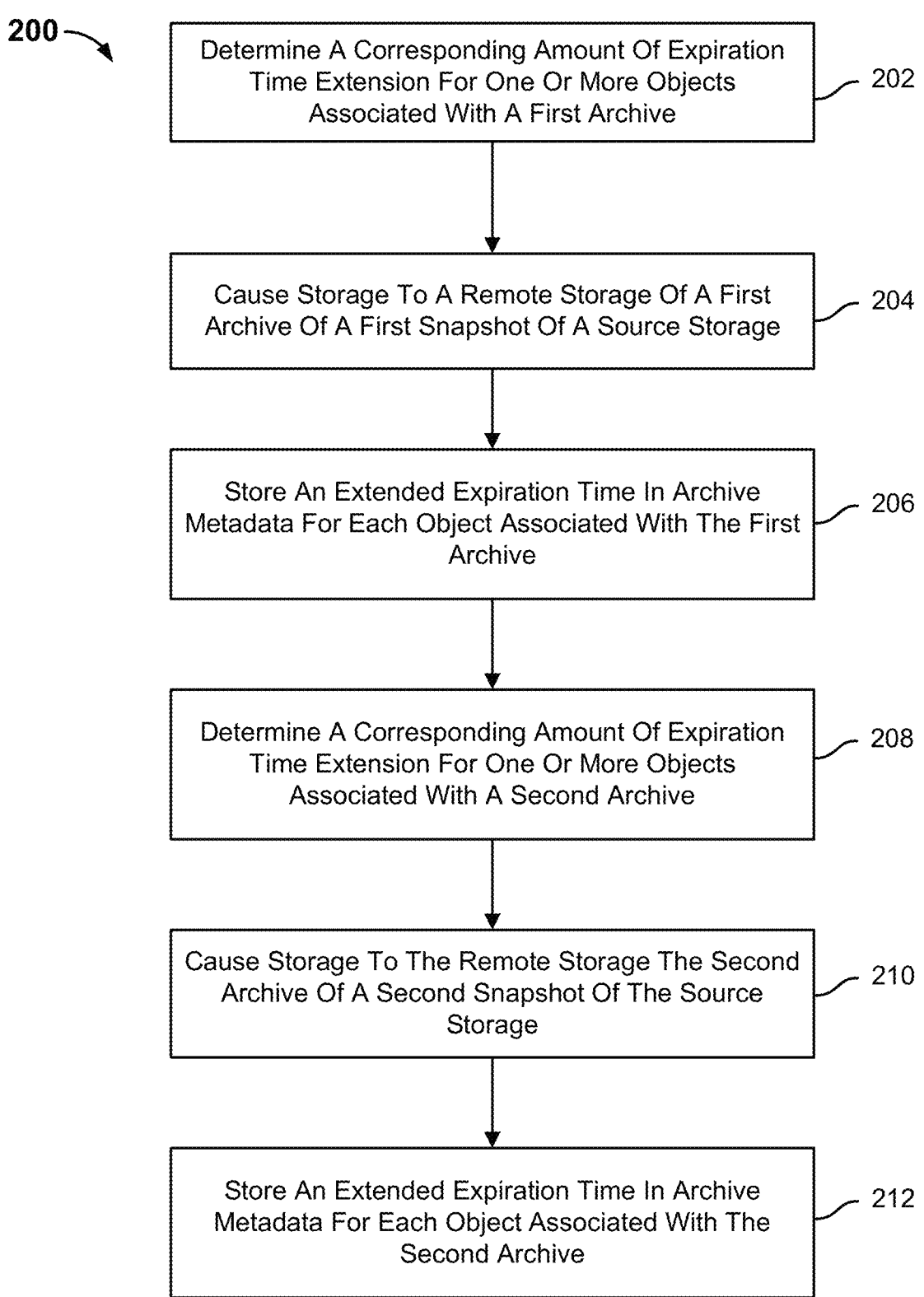

200

Determine A Corresponding Amount Of Expiration Time Extension For One Or More Objects Associated With A First Archive — 202

Cause Storage To A Remote Storage Of A First Archive Of A First Snapshot Of A Source Storage — 204

Store An Extended Expiration Time In Archive Metadata For Each Object Associated With The First Archive — 206

Determine A Corresponding Amount Of Expiration Time Extension For One Or More Objects Associated With A Second Archive — 208

Cause Storage To The Remote Storage The Second Archive Of A Second Snapshot Of The Source Storage — 210

Store An Extended Expiration Time In Archive Metadata For Each Object Associated With The Second Archive — 212

FIG. 2A

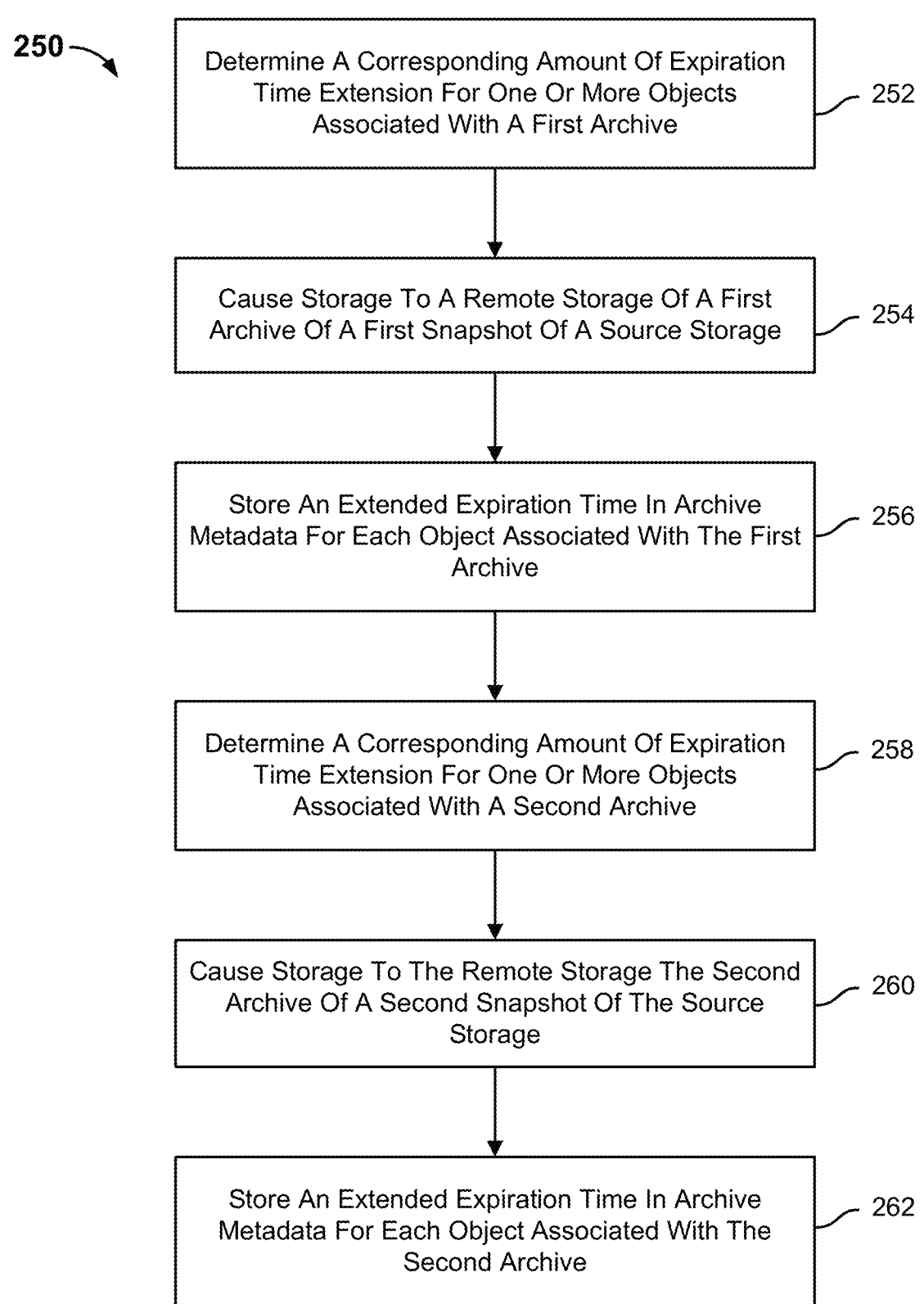

250

Determine A Corresponding Amount Of Expiration Time Extension For One Or More Objects Associated With A First Archive — 252

Cause Storage To A Remote Storage Of A First Archive Of A First Snapshot Of A Source Storage — 254

Store An Extended Expiration Time In Archive Metadata For Each Object Associated With The First Archive — 256

Determine A Corresponding Amount Of Expiration Time Extension For One Or More Objects Associated With A Second Archive — 258

Cause Storage To The Remote Storage The Second Archive Of A Second Snapshot Of The Source Storage — 260

Store An Extended Expiration Time In Archive Metadata For Each Object Associated With The Second Archive — 262

Determine To Store An Archive That Includes One Or More Objects Comprised Of One Or More Chunk Objects — 302

304
Subject To Data Lock Period?

308
Establish An Expiration Time For The One Or More Objects Associated With The Archive ←No—

Yes

Establish An Extended Expiration Time For The One Or More Objects Associated With The Archive — 306

400

Monitor Expiration Times Of One Or More Objects Associated With An Archive ⌐ 402

Metrics Indicate To Update? ⌐ 404

No→

Maintain The Corresponding Expiration Times For One Or More Objects Associated With The Archive

408

Yes

Update The Corresponding Expiration Times For One Or More Objects Associated With The Archive ⌐ 406

500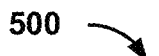
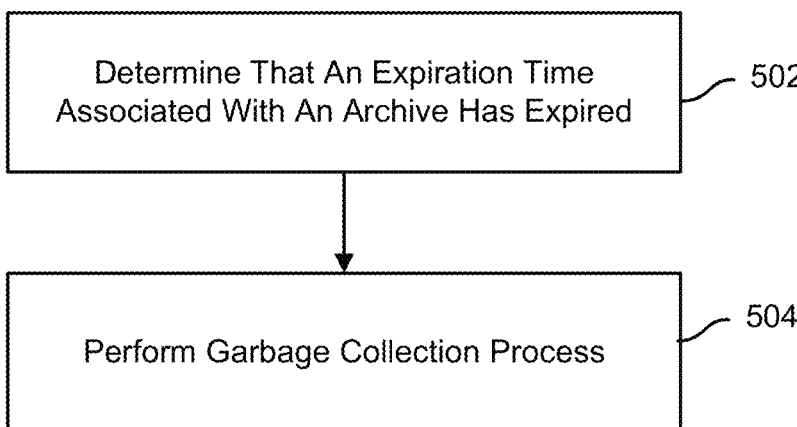
Determine That An Expiration Time Associated With An Archive Has Expired — 502
Perform Garbage Collection Process — 504
FIG. 5

1100

EXTENDING AN EXPIRATION TIME OF AN OBJECT ASSOCIATED WITH AN ARCHIVE

CLAIM OF PRIORITY

This application is a continuation of U.S. patent application Ser. No. 17/589,116, filed Jan. 31, 2022, the entire contents of which is incorporated herein by reference.

BACKGROUND OF THE INVENTION

Data associated with a source system (e.g., metadata, data content) may be archived to a cloud storage associated with a cloud storage provider. A user associated with the source system may have access (e.g., read or write) to the archived data that is stored in a cloud storage. The user associated with the source system may manually manage the archived data that is stored in the cloud storage, but accidentally delete some of the data due to a malicious attack (e.g., virus, ransomware) or human error. The user's credentials may be compromised and as a result, the archived data that is stored in the cloud may be subject to ransomware. The cloud storage provider provides the ability to establish a data lock for an object, which prevents a user from deleting or modifying the object during the data lock period. The data lock period may be associated with a compliance mode or a governance mode. In compliance mode, an object may not be deleted or modified, by any user, regardless of permissions. In governance mode, an object may not be deleted or modified, except for one or more users with special privileges. The data lock period begins at the time the data lock is applied to the one or more objects included in an archive (e.g., at the time of archive creation, in response to a user configuring a data lock for an archive, etc.) and may be extended if an object associated with a subsequent archive references data chunks associated with the archive.

BRIEF DESCRIPTION OF THE DRAWINGS

Various embodiments of the invention are disclosed in the following detailed description and the accompanying drawings.

FIG. 2A is a flow diagram illustrating a process for extending a corresponding expiration time of one or more objects associated with an archive in accordance with some embodiments.

FIG. 2B is a flow diagram illustrating a process for extending a corresponding expiration time of one or more objects associated with an archive in accordance with some embodiments.

FIG. 5 is a flow diagram illustrating a process for performing garbage collection in accordance with some embodiments.

DETAILED DESCRIPTION

Figure 1A:
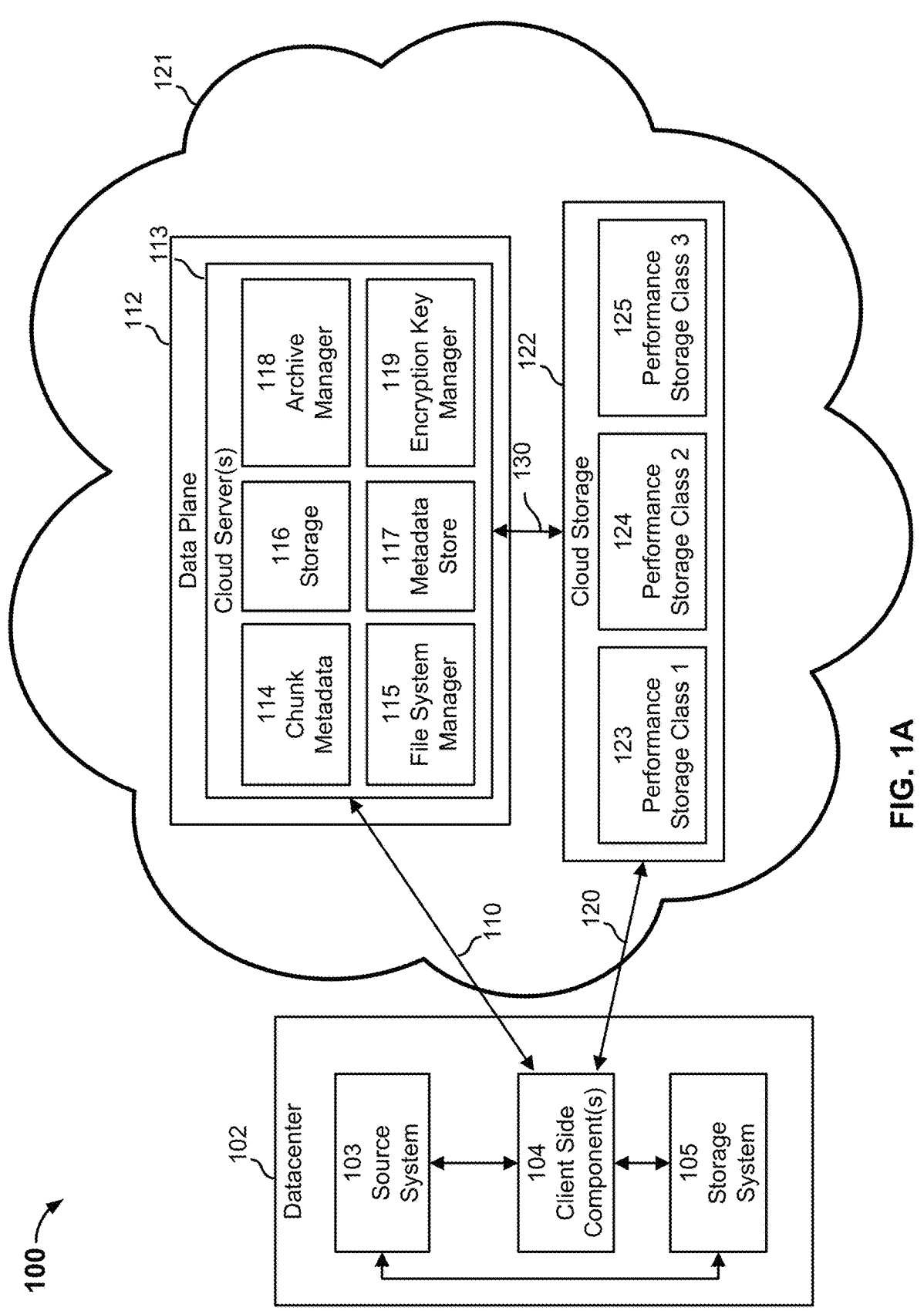
FIG. 1A is a block diagram illustrating a system for extending a corresponding expiration time of one or more objects associated with an archive in accordance with some embodiments.

Data associated with a source system is archived to a remote storage. An initial archive associated with the source system corresponds to a state associated with the source system at a first particular point in time. In some embodiments, the initial archive corresponds to a full archive of the source system. In some embodiments, the initial archive corresponds to a full archive of one or more objects associated with the source system. One or more subsequent incremental archives associated with the source system may correspond to states associated with the source system at different points in time. In some embodiments, a subsequent archive corresponds to an incremental archive of the source system. In some embodiments, the subsequent archive corresponds to an incremental archive of one or more objects associated with the source system. Some of the data that was stored on the source system at the first particular point in time may also be stored on the source system at the different points in time. A subsequent incremental archive includes data that was not previously archived to the remote storage. Data included in a subsequent incremental archive may be deduplicated against data included in one or more previous archives to reduce the amount of storage used.

The initial archive and the one or more subsequent incremental archives of the source system are associated with corresponding expiration times. An expiration time associated with an archive may be based on a retention period associated with an archive, or based on the retention period associated with the archive and a data lock period associated with the archive. When an expiration time for an archive expires, one or more data chunks associated with the archive may be removed from the remote storage via a garbage collection process. Object(s) associated with the one or more subsequent incremental archives may reference one or more data chunks included in an object associated with an expired archive. However, removing these referenced data chunks would cause data corruption issues for the one or more subsequent incremental archives because the object(s) associated with the one or more subsequent incremental archives would be missing data chunks necessary to recover the object(s). An object may refer to a data object (e.g., files, virtual machines, databases, applications, containers, etc.).

A cloud storage provider provides the ability to establish a data lock for an object. A storage system provider may provide an entity associated with the source system the ability to specify a corresponding data management policy for each of the plurality of archives using the feature provided by the cloud storage provider. For example, a data management policy may specify a retention period for an archive and a data lock period for an archive. The expiration time for an archive is the date when the archive may be subject to garbage collection, which is the expiration time of the retention period or data lock period, whichever expires last.

A retention period for an archive is the amount of time for which the archive and the data chunks it references are to be stored in cloud storage before the archive and the data chunks it references are eligible to be removed from cloud storage. The retention period for the archive begins when the archive is stored in cloud storage (e.g., archive creation time). An object containing data chunks referenced by an archive that is subject to a retention period, but not subject to a data lock period may be modified at any time prior to expiration of the retention period. The nature of such a modification must be to preserve the data referenced by the archive.

A data lock period for an archive is the minimum amount of time for which one or more objects associated with an archive are locked (e.g., write once read many (WORM) protected). In some embodiments, the one or more objects associated with the archive cannot be deleted or modified during the data lock period, by any user, regardless of permissions. In some embodiments, the one or more objects associated with the archive cannot be deleted or modified during the data lock period, by any user, except for one or more users with special privileges. The data lock period begins at the time the data lock is applied to the one or more objects included in an archive (e.g., at the time of archive creation, in response to a user configuring a data lock for an archive, etc.) and the data lock period associated with an archive may be extended but never reduced.

An expiration time may be specified for an archive prior to the archive being stored or after the archive is stored in cloud storage. The expiration time may be specified in a data management policy associated with the archive. The expiration time for an archive is stored in an archive metadata object associated with the archive that is stored in the cloud storage. An expiration time for an object associated with the archive may be extended when one or more objects associated with one or more subsequent archives are stored in the cloud storage and include corresponding references to one or more data chunks included in the object associated with the archive.

One technique to update the data lock period for one or more objects associated with one or more previous archives when a subsequent incremental archive is performed is to update the data lock period for the one or more objects associated with the one or more previous archives that include one or more data chunks referenced by one or more objects associated with the subsequent incremental archive when the subsequent incremental archive is stored in the cloud storage. However, a subsequent incremental archive often references many of the same objects included in one or more previous archives. The expiration times for these referenced objects need to be updated to prevent data corruption issues.

The process of determining whether one or more objects associated with one or more previous archives include one or more data chunks that are referenced by one or more objects included in a subsequent incremental archive and updating the corresponding expiration times stored by one or more archive metadata objects for the one or more determined objects associated with one or more previous archives is a resource intensive and time-consuming process. Furthermore, each expiration time update requires a corresponding application program interface (API) call to the cloud storage. This may result in a large number of API calls to the cloud storage each time a subsequent incremental archive is stored in the cloud storage. Some cloud storage providers may increase storage costs based on the number of received API calls. The process of updating expiration times for one or more objects associated with one or more previous archives may be repeated each time a subsequent incremental archive is stored to the cloud storage. As a result, the storage costs associated with storing a plurality of archives is dependent on the number of API calls needed to update expiration times.

Techniques to extend an expiration time for one or more objects associated with an archive are disclosed herein. The disclosed techniques reduce the resources and time needed to update the corresponding expiration times for the one or more objects associated with one or more previous archives that are referenced by one or more objects included in a subsequent incremental archive by reducing the number of API calls to the cloud storage. Although the techniques are described with respect to archived deduplicated data, the techniques disclosed herein may be applicable whenever a data management operation (e.g., backup, migration, replication, tiering, etc.) is performed for a cohort of data that is provided from a first storage system to a second storage system and stored at the second storage system.

A first archive of a first snapshot of a source storage is caused to be stored to a remote storage. The first archive includes one or more objects. Each of the one or more objects is comprised of one or more chunk objects. Each of the one or more chunk objects is comprised of one or more data chunks. The first archive is associated with a first data management policy that specifies an expiration time for the first archive. The first data management policy specifies a retention period for the first archive. The first data management policy may or may not specify a data lock period for the first archive. A corresponding expiration time may be established for each of the one or more objects associated with the first archive. Other systems may set the corresponding expiration time for the one or more objects associated with the first archive to be the expiration time associated with the retention period for the first archive or the data lock period for the first archive, whichever expires last. Instead of specifying a corresponding expiration time for the one or more objects included in the first archive to be the expiration time associated with the first data management policy, the corresponding expiration time for the one or more objects included in the first archive is extended based on in part on one or more data management policies associated with one or more subsequent archives (e.g., a corresponding data lock period associated with one or more subsequent incremental archives) and one or more dynamically determined metrics (e.g., a historical rate of data change between archives, a predicted rate of data change between archive, an amount of data change between the archives, a percentage of data change between the archives, a fragment length (e.g., the average length of contiguous logical storage), and/or a storage cost associated with storing the archive).

Overextending the expiration time of the objects associate with an archive reduces the number of API calls to the cloud storage in relation to subsequent archives, but the cost savings associated with the API calls may be offset by extra storage costs. Underextending the expiration time of objects associated with an archive may reduce overall storage costs in relation to subsequent archives, but the storage cost savings may be offset by the costs associated with too many API calls to the cloud storage. Preferably, the expiration time for the one or more objects included in an archive is extended to a point in time that balances the storage costs and the costs associated with API calls to the cloud storage. An amount of expiration time extension for the first archive may be determined using a model, such as a machine learning model, a rules-based model, a heuristic model, a deterministic model, etc. The expiration time extension plus the expiration time associated with the first data manage-ment policy is stored as the extended expiration time for the one or more objects included in the first archive in archive metadata for each object associated with the first archive.

An archive manager may determine a corresponding extended expiration time for one or more objects associated with an archive when an archive is to be stored at the cloud storage because a data lock period associated with a data management policy and/or the one or more dynamically determined metrics may have changed since the previous archive was stored at the cloud storage. In some embodi-ments, the corresponding extended expiration time is deter-mined each time an archive is stored at the cloud storage. In some embodiments, the corresponding extended expiration time is sometimes determined (e.g., every other time, more than half the time, etc.) when an archive is stored at the cloud storage. In some embodiments, the expiration time extension for one or more objects associated with a current archive is greater than the expiration time extension associated for one or more objects associated with a previous archive. In some embodiments, the expiration time extension for one or more objects associated with a current archive is equal to the expiration time extension for one or more objects associated with a previous archive. In some embodiments, the expira-tion time extension for one or more objects associated with a current archive is less than the expiration time extension for one or more objects associated with a previous archive, but the extended expiration time of the one or more objects associated with current archive does not expire before the expiration time of one or more objects associated with any previous archive that includes data chunk(s) referenced by the one or more objects associated with the current archive.

After an archive and the one or more objects associated with the archive have been stored at the cloud storage, the expiration time of the one or more objects associated with the archive may be updated at a later point in time. In some embodiments, the later point in time is a point in time predicted by the model. The predicted point in time may be based on the rate of data change between archives. In some embodiments, the later point in time is a threshold amount of time before the extended expiration time expires. In some embodiments, the later point in time is the extended expi-ration time.

At the later point in time, the archive manager determines that an expiration time associated with an archive has expired, whether to update the corresponding expiration times for one or more objects associated with the archive, and if necessary, the archive manager further extends the corresponding expiration times for one or more objects associated with the archive that are referenced by one or more objects having an expiration time that exceeds the corresponding expiration times for one or more objects associated with the archive. This may improve costs savings associated with storing data in cloud storage while balancing the number of API calls.

After the expiration time for an archive has expired, one or more objects associated with the archive may be eligible for garbage collection. The storage system may periodically implement a garbage collection process (e.g., daily, weekly, bi-monthly, monthly, etc.). In some embodiments, the stor-age system implements the garbage collection process in response to a threshold amount of storage space being used. The archive manager may implement a plurality of workers to determine whether an object and its associated chunks objects can be deleted via the garbage collection process. An archive manager may assign a corresponding worker of the plurality of workers to one of the archives stored at the cloud storage. A corresponding worker determines a garbage col-lection eligibility status for each of the objects associated with an assigned archive and provides the determined gar-bage collection eligibility statuses to the archive manager. A worker may determine that an object associated with an archive may be eligible for garbage collection in the event the expiration time associated with the archive that includes the object has expired. A worker may determine that an object associated with a previous archive may be ineligible for garbage collection in the event the expiration time associated with a subsequent archive has not expired and an object associated with the subsequent archive includes one or more references to one or more data chunks included in the object associated with the previous archive. The archive manager combines the expiration status results for the archives. For example, a first worker associated with a first archive determines that a first object may be eligible for garbage collection because the expiration time associated with the first archive has expired and a second worker associated with a second archive determine that the first object may not be eligible for garbage collection because the expiration time associated with the second archive has not expired and a second object associated with the second archive includes one or more references to one or more data chunks included in the object associated with the first archive.

An object may be associated with one or more archives because one or more data chunks included in an object associated with a first archive may be referenced by one or more other objects associated with other archives. In the event a first worker indicates that a first object associated with a first archive may be eligible for garbage collection and none of the one or more workers associated with one or more other archives indicate that one or more objects reference data chunks associated with the first object, the archive manager determines that the one or more chunk objects associated with the first object are eligible for garbage collection. In the event a first worker indicates that a first object associated with a first archive may be eligible for garbage collection and at least one of the one or more workers associated with one or more other archives indicates that one or more objects reference data chunks associated with the first object, the archive manager determines that the one or more chunk objects associated with the first object are not eligible for garbage collection.

FIG. 1A is a block diagram illustrating a system for extending a corresponding expiration time of one or more objects associated with an archive in accordance with some embodiments. In the example shown, system 100 includes a client-side component 104 that is connected to data plane 112 via connection 110 and connected to cloud storage 122 via connection 120. In some embodiments, connection 110 is a gRPC connection or other type of connection. In some embodiments, connection 120 is a HTTPS connection or other type of connection. In some embodiments, connections 110, 120 may be intermittent connections. The connection between client-side component 104 and data plane 112 or between client-side component 104 and cloud storage 122 may be a wireless or wired connection. Connections 110, 120 may communicate data and/or information via a local area network, a wide area network, a storage area network, campus area network, metropolitan area network, system area network, intranet, the Internet, and/or a combination thereof. Cloud server 113 is connected to cloud storage 122 via connection 130.

The one or more client-side components 104 are located in datacenter 102 (e.g., real datacenter or virtual datacenter) that is associated with an entity (e.g., a user, an organization, a business, an enterprise, a government, etc.). In some embodiments, one or more client-side components 104 are located in cloud environment 121, such as in data plane 112. A client-side component may be a virtual machine, a container, a server, an application, etc. The one or more client-side components 104 are connected (e.g., temporarily or persistently) to source system 103. In some embodiments, the one or more client-side components 104 are included in source system 103. In some embodiments, source system 103 is a primary system. In some embodiments, source system 103 is a secondary storage system that backed up data from other sources (not shown). Source system 103 may be comprised of one or more computing devices (e.g., servers, desktops, laptops, etc.).

In some embodiments, the one or more client-side components are included in a storage system 105. Storage system 105 is configured to back up content from source system 103. In some embodiments, the storage nodes of storage system 105 are homogenous nodes where each storage node has the same capabilities (e.g., processing, storage, memory, etc.). In some embodiments, at least one of the storage nodes of the secondary storage system is a heterogeneous node with different capabilities (e.g., processing, storage, memory, etc.) than the other storage nodes of secondary storage system.

In some embodiments, a storage node of storage system 105 includes a processor, memory, and a plurality of storage devices. The plurality of storage devices may include one or more solid state drives, one or more hard disk drives, or a combination thereof. Backed up data may be stored in the one or more solid state drives, one or more hard disk drives, or a combination thereof.

In some embodiments, a storage node of storage system 105 includes a processor and memory, and is coupled to a separate storage device. The separate storage device may include one or more storage devices (e.g., flash storage devices). A storage device may be segmented into a plurality of partitions. Each of the storage nodes may be allocated one or more of the partitions. The one or more partitions allocated to a storage node may be configured to store data associated with some or all of the changed objects that were backed up to the secondary storage system. For example, the separate storage device may be segmented into 10 partitions and the secondary storage system may include 10 storage nodes. A storage node of the 10 storage nodes may be allocated one of the 10 partitions.

In some embodiments, a storage node of storage system 105 includes a processor, memory, and a storage device. The storage node may be coupled to a separate storage device. The separate storage device may include one or more storage devices. A storage device may be segmented into a plurality of partitions. Each of the storage nodes may be allocated one or more of the partitions. The one or more partitions allocated to a storage node may be configured to store data associated with some or all of the changed objects that were backed up to the storage system. For example, the separate storage device may be segmented into 10 partitions and the secondary storage system may include 10 storage nodes. A storage node of the 10 storage nodes may be allocated one of the 10 partitions.

Source system 103 includes content (e.g., virtual machines, applications, files, filesystem data, containers, metadata, database, etc.) that is to be archived to cloud storage 122. A client-side component is configured to receive the content to be archived from source system 103 and to archive the received content. In some embodiments, the client-side component is configured to archive some or all of the received content to cloud storage 122. In some embodiments, the client-side component is configured to archive some of the received content to cloud storage 122 via storage 116 included in data plane 112.

Data plane 112 is configured to orchestrate how content associated with source system 103 is stored in cloud storage 122. For example, content associated with source system 103 may be stored in a first performance storage class 123 (e.g., Amazon Simple Storage Service (S3)), a second performance storage class 124 (e.g., Amazon S3 Glacier), or a third performance storage class 125 (e.g., Amazon S3 Glacier Deep Archive). Although FIG. 1 depicts cloud storage 122 as having three performance storage classes, cloud storage 122 may have n performance storage classes. Each of the performance storage classes corresponds to an object storage provided by a cloud provider (e.g., Amazon Web Services™, Microsoft™ Azure, Google Cloud™, etc.) that provides cloud environment 121 (e.g., public cloud, private cloud, hybrid cloud, etc.). The speed at which data may be accessed is different depending on whether the data is stored in the first performance storage class 123, the second performance storage class 124, or the third performance storage class 125.

Data plane 112 includes one or more cloud servers 113 (e.g., one or more EC2 instances). The one or more cloud servers 113 may be associated with corresponding processors, corresponding memory, and corresponding storage. In some embodiments, data plane 112 includes multiple sets of one or more cloud servers 113. For example, data plane 113 may include a first set of one or more cloud servers 113 that is associated with a first region and a second set of one or more cloud servers 113 that is associated with a second region.

The one or more cloud servers 113 may receive an indication that a client-side component 104 stored one or more data chunks at chunk objects stored in a performance storage class of cloud storage 122. The received indication may indicate the client-side component has finalized sending the one or more data chunks.

File system manager 115 is configured to generate archive metadata for the one or more data chunks stored in the cloud storage by the client-side component. The archive metadata may be comprised of a plurality of data structures, such as a tree data structure, an archive chunk metadata data structure, and/or a chunk object metadata data structure. The one or more cloud servers 113 include a metadata store 117 that is configured to store the archive metadata. Metadata store 117 is included in a memory or a storage of cloud servers 113.

A tree data structure is configured to store metadata that enables data chunks associated with an archive to be located in cloud storage 122. The tree data structure is generated each time an archive of a snapshot of a source storage is performed. An example of the tree data structure is a snapshot tree, which may be based on a B+ tree structure (or other type of tree structure in other embodiments).

A snapshot tree may provide a view of a source storage of source system 103 at a particular point in time. The snapshot tree includes a root node, one or more levels of one or more intermediate nodes associated with the root node, and one or more leaf nodes associated with an intermediate node of the lowest intermediate level. The root node of a snapshot tree includes one or more pointers to one or more intermediate nodes. Each intermediate node includes one or more pointers to other nodes (e.g., a lower intermediate node or a leaf node). A leaf node may store file system metadata (e.g., owner, created, last update, size, file permissions, etc.), data associated with an object that is less than or equal to a limit size (e.g., 256 kB), an identifier of a data brick, one or more pointers to one or more metadata structures (e.g., Blob structure), etc. A leaf node of the snapshot tree may correspond to an inode.

A metadata structure may be generated for an object (e.g., a content file, a virtual machine, a container, an application, a database, etc.) that is greater than the limit size (e.g., 256 kB) and was included in the source system content that was archived to the cloud storage. The metadata structure is configured to store the metadata associated with an object that enables the data chunks associated with the object to be located. The metadata structure includes a root node, one or more levels of one or more intermediate nodes associated with the root node, and one or more leaf nodes associated with an intermediate node of the lowest intermediate level. A metadata structure is similar to a snapshot tree, but a leaf node of a metadata structure includes an identifier of a data brick associated with one or more data chunks of the object and metadata associated with the one or more data chunks (e.g., chunk identifier, chunk object identifier, etc.). A leaf node of the snapshot tree may include a pointer to a root node of the metadata structure corresponding to an object. The location of the one or more data chunks associated with a data brick may be identified using an archive chunk metadata data structure and/or a chunk object metadata data structure.

An archive chunk metadata data structure (e.g., a table) includes a plurality of entries. Each entry associates a chunk identifier associated with a data chunk with a chunk object identifier corresponding to a chunk object storing the data chunk.

A chunk object metadata data structure (e.g., a table) includes a plurality of entries. Each entry corresponds to a chunk object and associates a chunk object identifier for the chunk object with one or more chunk identifiers corresponding to one or more data chunks stored in the chunk object and metadata associated with the chunk object (e.g., offset information of data chunks within the chunk object).

The one or more data chunks associated with a data brick may be located based on the archive chunk metadata data structure and the chunk object metadata data structure. For example, a first data brick having a first brick identifier may be associated with a first chunk identifier (e.g., secure hash algorithm 1 (SHA-1) hash value). The first chunk identifier may be used in conjunction with the archive chunk metadata data structure to identify a chunk object identifier. A chunk object having the identified chunk object identifier is comprised of a plurality of data chunks. The chunk object metadata data structure may be used to identify a corresponding location of a data chunk. The chunk object metadata data structure may include corresponding offset information for a data chunk within a chunk object. In some embodiments, a corresponding location for the one or more data chunks associated with the data brick are stored in a leaf node of a tree data structure.

File system manager 115 may generate a metadata object that corresponds to a tree data structure. A metadata object is a serialized version of a tree data structure and is comprised of a flat set of data that includes a plurality of data blocks where each data block of the flat set of data corresponds to a node of the tree data structure. A data block that corresponds to a root node or intermediate node of the tree data structure includes a file offset to another data block of a flat set of data. A data block that corresponds to a leaf node of a snapshot tree includes a file offset to a data block corresponding to a root node of a metadata structure. A data block that corresponds to a leaf node of a metadata structure includes a reference to a storage location for one or more data chunks with which the leaf node is associated (e.g., a chunk object). A storage of a storage node of storage system 105 or cloud server 113 may be less reliable and/or more expensive than cloud storage 122. The metadata for the one or more data chunks may be serialized and stored at cloud storage 122 to ensure that the metadata for the one or more data chunks is not lost in the event the storage of a storage node or a cloud server fails.

Data plane 112 includes archive manager 118 that is configured to determine when data associated with source system 103 is to be archived to cloud storage 122 according to an archive policy. The archive policy may indicate an archive is to be performed periodically (e.g., daily, weekly, monthly, etc.), when an object is accessed less than an access frequency threshold period (e.g., accessed less than five times in the past six months), or in response to a user command.

Archive manager 118 may provide to the one or more client-side components 104 a specification of content to be archived from source system 103 to cloud storage 122. In some embodiments, the specification of content describes a full archive of source system 103. In some embodiments, the specification of content describes an incremental archive of source system 103. An incremental archive of source system 103 includes data stored on source system 103 that was not previously archived. After a full archive of source system 103 is performed, the subsequent archives of source system 103 may be incremental archives (e.g., incremental forever). Data included in a subsequent incremental archive may be deduplicated against data included in one or more previous archives to reduce the amount of storage used by an entity associated with the source system. In some embodiments, data included in a subsequent incremental archive may be deduplicated against data in the same performance storage class, a different performance storage class, or other source systems associated with the entity. In some embodiments, the specification of content describes a performance storage class for the data associated with an archive. For example, the one or more client-side components 104 may provide the data associated with an archive of a snapshot of source system 103 to the first performance storage class 123, the second performance storage class 124, or the third performance storage class 125.

In some embodiments, the specification of content describes a full archive of an object included in source system 103. In some embodiments, the specification of content describes an incremental archive of an object included in source system 103. In some embodiments, the specification of content describes a performance storage class for one or more objects stored on source system 103. For example, the one or more client-side components 104 may tier an archive of an object stored on source system 103 to the first performance storage class 123, the second performance storage class 124, or the third performance storage class 125.

In some embodiments, the one or more client-side components 104 are configured to receive the content in a plurality of portions from source system 103. For each received portion of content, a client-side component divides the received portion of content into a plurality of data chunks. In some embodiments, a specification of content to be archived to cloud storage 122 is received from archive manager 118. In some embodiments, a specification of content to be archived to cloud storage 122 is received from source system 103. In some embodiments, the plurality of data chunks may be of variable size. The one or more client-side components 104 may generate corresponding chunk identifiers (e.g., SHA-1 identifier, SHA-2 identifier, SHA-256 identifier, etc.) for each of the plurality of data chunks included in a portion of received content.

A client-side component may identify one or more data chunks of the plurality of data chunks that are to be sent via network connection 120 to cloud storage 122 at least in part by sending to file system manager 115 the corresponding chunk identifiers for each of the plurality of data chunks included in a portion of received content. In response to receiving the corresponding chunk identifiers for each of the plurality of data chunks, file system manager 115 is configured to compare each of the corresponding chunk identifiers to chunk identifiers included in an archive chunk metadata data structure. The chunk identifiers included in the archive chunk metadata data structure indicate at least some of the data chunks that are stored in in the first performance storage class 123 of cloud storage 122.

File system manager 115 is configured to provide the client-side component a data structure that indicates the one or more chunk identifiers of the one or more received chunk identifiers that are not included in the archive chunk metadata data structure. In response to receiving the data structure, the client-side component is configured to use the data structure to identify the one or more data chunks of the portion of the received content that are to be sent via network connection 120 to be stored at cloud storage 122.

File system manager 115 may also provide an indication of one or more chunk objects of performance storage class 123 to which a client-side component may write the one or more data chunks associated with the one or more chunk identifiers included in the data structure. The indication of the one or more chunk objects includes corresponding chunk object identifiers for the one or more chunk objects. In some embodiments, the one or more chunk objects include one or more new chunk objects, one or more existing chunk objects, and/or one or more chunk objects yet to be created. In some embodiments, file system manager 115 periodically (e.g., every hour) provides to the one or more client-side components 104 an indication of a set of one or more chunk objects.

A client-side component may receive an encryption key from encryption key manager 119. Encryption key manager manages encryption keys for a plurality of storage tenants. The received encryption key is particular to the storage tenant. In some embodiments, the encryption key enables read access for a chunk object associated with the storage tenant at a credential level or write access for a new chunk object associated with the storage tenant at a credential level. In some embodiments, the encryption key enables read or write access for a new chunk object associated with the storage tenant at a prefix level. For example, a prefix may be a partial or full file path in the cloud storage. A prefix may be unique to a storage tenant. Some or all chunk objects of a particular storage tenant may be stored in cloud storage and share a prefix. The encryption key may expire after a particular amount of time. Source system 103 may be hacked and having the encryption key expire after the particular amount of time may prevent a hacker from accessing any of the chunk objects stored at cloud storage 122.

A client-side component may combine a plurality of the identified data chunks into one or more batches. The client-side component archives a batch of data chunks to cloud storage 122 by encrypting the data chunks included in the batch with the received encryption key and writing the encrypted data chunks to one of the chunk objects identified by file system manager 115. In some embodiments, the data chunks are compressed prior to being encrypted. The client-side component may write the encrypted data chunks to a chunk object associated with the first performance storage class 123, the second performance storage class 124, or the third performance storage class 125.

After a client-side component has written some or all of one or more batches of data chunks to one or more chunk objects of cloud storage 122, the one or more client-side components 104 may be configured to provide file system manager 115 an indication that the one or more chunk objects have been finalized. A chunk object may be finalized when cloud storage 122 receives and stores all of the plurality of data chunks associated with the chunk object. In response to receiving the indication, file system manager 115 is configured to complete generating metadata for the one or more data chunks stored in cloud storage 122 by one of the one or more client-side components 104. The metadata for the one or more data chunks may include a tree data structure, an archive chunk metadata data structure, and/or chunk object metadata data structure.

An archive stored at cloud storage 122 is comprised of chunk objects, metadata objects, and an archive metadata object. A chunk object is configured to store a plurality of data chunks that are associated with one or more objects (e.g., a file, a virtual machine, a database, an application, a container, a pod, etc.). The data content associated with the one or more objects is comprised of a plurality of chunk objects. Each of the plurality of chunk objects is comprised of one or more data chunks. A corresponding expiration time may be established for each object included in an archive.

A metadata object is configured to store metadata that enables the data chunks associated with an archived object to be located. The metadata object stores a serialized version of a tree data structure as a flat set of data. Each block of the metadata object corresponds to a node of the tree data structure.

An archive metadata object is configured to store metadata associated with an archive, which may include file system permissions (e.g., user access permissions to file system), type of object, timestamp associated with a source storage snapshot, a pointer to a block of a metadata object that corresponds to a root node of a tree data structure, expiration time of the archive, etc. Each archive is associated with a corresponding archive metadata object.

Figure 1B:
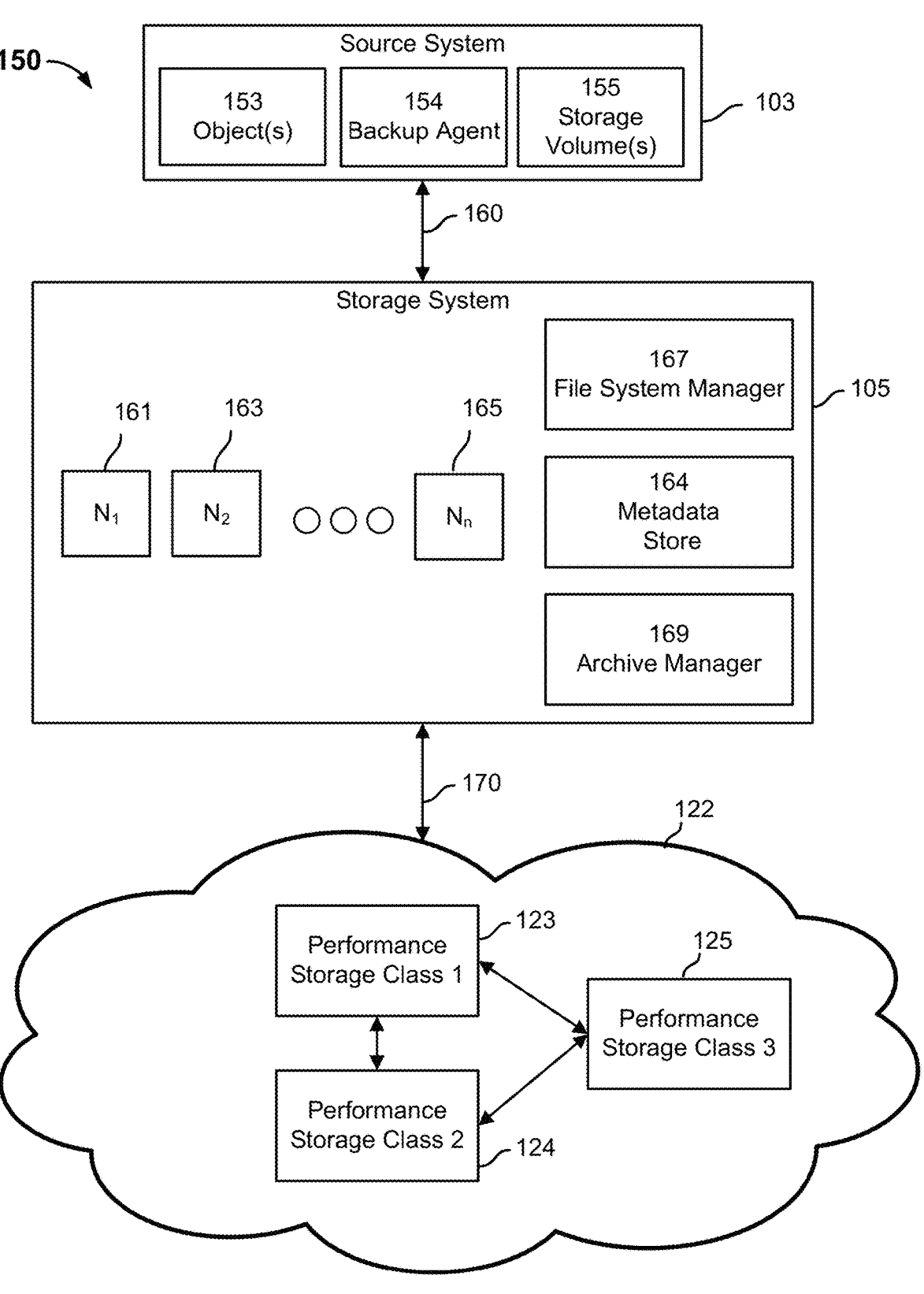
FIG. 1B is a block diagram illustrating a system for extending a corresponding expiration time of an object associated with an archive in accordance with some embodiments.

FIG. 1B is a block diagram illustrating a system for extending a corresponding expiration time of one or more objects associated with an archive in accordance with some embodiments. In the example shown, system 150 includes source system 103, a storage system 105, and a cloud storage 122.

Source system 103 is a computing system that stores file system data. The file system data may include a plurality of files (e.g., content files, text files, etc.) and metadata associated with the plurality of files (e.g., creation time, owner, modification time, file size, etc.). A file may be referred to as an object herein. Source system 103 may be configured to run one or more objects 153. Examples of objects include, but are not limited to, a virtual machine, a database, an application, a container, a pod, etc. Source system 103 may include one or more storage volumes 155 that are configured to store file system data associated with source system 103. The file system data associated with source system 103 includes the data associated with the one or more objects. Source system 103 may be comprised of one or more servers, one or more computing devices, one or more storage devices, and/or a combination thereof. Snapshots of source system 103 may be performed at different points in time and stored in one of the one or more storage volumes 155.

A backup of source system 103 may be performed according to one or more backup snapshot policies. In some embodiments, a backup snapshot policy indicates that file system data is to be backed up on a periodic basis (e.g., hourly, daily, weekly, monthly, etc.), when a threshold size of data has changed, or in response to a command from a user associated with source system 103.

Backup agent 154 may be configured to cause source system 103 to perform a backup snapshot (e.g., a full backup snapshot or incremental backup snapshot). A full backup snapshot may include all of the file system data of source system 103 at a particular moment in time. In some embodiments, a full backup snapshot for a particular object of the one or more objects 153 is performed and the full backup snapshot of the particular object includes all of the object data (metadata, data content) associated with the particular object at a particular moment in time. In some embodiments, backup agent 154 is running on source system 103. In some embodiments, backup agent 154 is running in one of the one or more objects 153. In some embodiments, a backup agent 154 is running on source system 103 and a separate backup agent is running in one of the one or more objects 153. In some embodiments, an object includes a backup function and is configured to perform a backup snapshot on its own without backup agent 154. In some embodiments, source system 103 includes a backup function and is configured to perform a backup snapshot on its own without backup agent 154. In some embodiments, storage system 105 may provide instructions to source system 103, causing source system 103 to execute backup functions without backup agent 154.

Storage system 105 is comprised of a storage cluster that includes a plurality of storage nodes 161, 163, 165. Although three storage nodes are shown, storage system 105 may be comprised of n storage nodes. The storage nodes of storage system 105 may be configured in a manner as previously described. Storage system 105 may be configured to ingest a backup snapshot received from source system 103 and configured to store the data associated with the backup snapshot across the storage nodes 161, 163, 165 of the storage cluster.

Storage system 105 includes a file system manager 167 that is configured to organize the file system data of the backup snapshot using a tree data structure. The tree data structure may be used to capture different views of data. A view of data may correspond to a full backup snapshot, an incremental backup snapshot, a clone of data, a file, etc. The tree data structure allows a chain of snapshot trees to be linked together by allowing a node of a later version of a snapshot tree to reference a node of a previous version of a snapshot tree. The previous version of the snapshot tree may correspond to an earlier backup snapshot. For example, a root node or an intermediate node of a snapshot tree corresponding to a second backup snapshot may reference an intermediate node or leaf node of a snapshot tree corresponding to a first backup snapshot.

A snapshot tree is a representation of a fully hydrated restoration point because it provides a complete view of source system 103 or the one or more objects 153, or data generated on or by storage system 105 at a particular moment in time. A fully hydrated restoration point is a restoration point that is ready for use without having to reconstruct a plurality of backups to use it. Instead of reconstructing a restoration point by starting with a full backup and applying one or more data changes associated with one or more incremental backups to the data associated with the full backup, storage system 105 maintains fully hydrated restoration points. Any file associated with source system 105, an object at a particular time and the object's contents, or a file generated on or by the storage system, for which there is an associated reference restoration point, may be determined from the snapshot tree, regardless if the associated restoration point was a full reference restoration point or an intermediate reference restoration point.

Metadata store 164 is configured to store backup metadata, such as a plurality of tree data structures, a backup chunk metadata data structure, and a backup chunk file metadata data structure. The tree data structures generated by file system manager 167 are similar to the tree data structures generated by file system manager 115. Metadata store 164 may be stored in a memory or storage of storage nodes 161, 163, 165.

A backup chunk metadata data structure includes a plurality of entries. Each entry associates a chunk identifier associated with a data chunk with a chunk file identifier corresponding to a chunk file storing the data chunk.

A chunk file metadata data structure includes a plurality of entries. Each entry corresponds to a chunk file and associates a chunk file identifier for the chunk file with one or more chunk identifiers corresponding to one or more data chunks stored in the chunk file and metadata associated with the chunk file (e.g., offset information of data chunks within the chunk file).

The one or more data chunks associated with a data brick may be located based on the backup chunk metadata data structure and the chunk file metadata data structure. For example, a first data brick having a first brick identifier may be associated with a first chunk identifier (e.g., SHA-1 hash value). The first chunk identifier may be used in conjunction with the backup chunk metadata data structure to identify a chunk file identifier. A chunk file having the identified chunk file identifier is comprised of a plurality of data chunks. The chunk file metadata data structure may be used to identify a corresponding location of a data chunk. The chunk file metadata data structure may include corresponding offset information for a data chunk within a chunk file and/or a size for the data chunk.

Storage system 105 includes archive manager 169 that is configured to archive the backed data of source system 103 to cloud storage 122. The backed up data of source system 103 may be archived to the first performance storage class 123, the second performance storage class 124, or the third performance storage class 125. Archive manager 169 may perform a full archive or an incremental archive. A full archive includes the data that was included in a full backup snapshot of source system 103. An incremental archive includes the data that was included in an incremental backup snapshot of source system 103.

Metadata store 164 may include an archive chunk metadata data structure and a chunk object metadata data structure. Archive manager 169 may update the archive chunk metadata data structure and chunk object metadata data structure in a similar manner as archive manager 118.

FIG. 2A is a flow diagram illustrating a process for extending a corresponding expiration time of one or more objects associated with an archive in accordance with some embodiments. In the example shown, process 200 may be implemented by an archive manager, such as archive manager 118.

A source storage (e.g., NAS device) may be configured to generate snapshots of objects stored in a storage volume of the source storage. Each snapshot captures a state of an object, such as a file associated with the source storage at different points in time. An archive policy may indicate a frequency at which an archive of the source storage is to be performed (e.g., daily, weekly, monthly, etc.).

At 202, a corresponding amount of expiration time extension for one or more objects associated with a first archive of a first snapshot of the source storage is determined based at least in part on a data management policy associated with a second archive and one or more dynamically determined metrics.

The first archive is associated with a first data management policy. The first data management policy indicates an expiration time for the first archive. The expiration time associated with the first archive is based on a retention period associated with the first archive and may be based on, if specified by the first data management policy, a data lock period associated with the first archive. In some embodiments, a data management policy indicates a retention period for one or more objects associated with the archive. In some embodiments, a data management policy indicates a corresponding data lock period for one or more objects associated with the archive.

An expiration time may be specified for an archive prior to the archive being stored or after the archive is stored in cloud storage. A subsequent incremental archive often references many of the same objects included in one or more previous archives.

A corresponding expiration time may be established for one or more objects associated with the first archive. Instead of specifying the corresponding expiration time for one or more objects associated with the first archive to be the expiration time associated with the first data management policy, the corresponding expiration time for one or more objects associated with the first archive is extended based in part on one or more data management policies associated with one or more subsequent archives (e.g., a corresponding data lock period associated with one or more subsequent incremental archives) and one or more dynamically determined metrics (e.g., a historical rate of data change between archives, a predicted rate of data change between archives, an amount of data change between the archives, a percentage of data change between the archives, a fragment length (e.g., the average length of contiguous logical storage), and/or a storage cost associated with storing the archive).

The extended expiration time may be determined using a model, such as a machine learning model, a rules-based model, a heuristic model, a deterministic model, etc. In some embodiments, a machine learning model is trained to determine the expiration time extension based on a plurality of previous data management policies associated with one or more archives, historical rates of data change between archives, historical fragment lengths (e.g., the average length of contiguous logical storage), and/or historical storage cost associated with storing the archive). The machine learning model may receive feedback that indicates whether the determined expiration time extension overestimated the extended expiration time, underestimated the expiration time, or appropriately estimated. The machine learning model may be re-trained based on the feedback.

The machine learning model may be trained using a supervised machine learning algorithm. For example, the supervised machine learning algorithm may be a linear regression algorithm, a logistical regression algorithm, a random forest algorithm, a gradient boosted trees algorithm, a support vector machines algorithm, a neural networks algorithm, a decision tree algorithm, a Naïve Bayes algorithm, a nearest neighbor algorithm, or any other type of supervised machine learning algorithm. In some embodiments, the model is trained using a semi-supervised machine learning algorithm that utilizes one or more labeled data sets and one or more pseudo-labeled data sets.

In the embodiments, the model is trained using a reinforcement machine learning algorithm. For example, the reinforcement machine learning algorithm may be a Q-Learning algorithm, a temporal difference algorithm, a Monte-Carlo tree search algorithm, an asynchronous actor-critic agent's algorithm, or any other type of reinforcement machine learning algorithm.

In some embodiments, the model is trained using an unsupervised machine learning algorithm. For example, clustering methods, anomaly detection, neural network, etc.

At 204, the first archive of the first snapshot of the source storage is caused to be stored to a remote storage. The first snapshot captures a state of objects, such as a file associated with the source storage at a first point in time. The first archive is associated with one or more objects. At least a portion of content of the first archive is referenced from data chunks stored in a first chunk object of the remote storage.

An archive manager of a cloud server may determine that a condition associated with the archive policy has been satisfied and sends to a client-side component coupled to the source storage a specification of content to be archived from the source storage to the remote storage. In some embodiments, the specification of content to be archived for a first archive describes a full archive of the source storage. In some embodiments, the specification of content to be archived describes a full archive of an object included in the source storage (e.g., file, virtual machine, container, application, etc.).

In response to receiving the specification of content to be archived from the archive manager, the client-side component is configured to perform the first archive by requesting the content from the source storage. The source storage utilizes the first snapshot to provide the requested content in a plurality of portions to the client-side component. A portion of content may include metadata associated one or more objects stored in the source storage (e.g., owner, created, last update, size, permissions, etc.) and/or data content associated with the one or more objects stored in the source storage.

For each received portion of content, the client-side component divides the received portion of content into a plurality of data chunks, which may be variable-sized. The client-side component may generate corresponding chunk identifiers (e.g., SHA-1 identifier) for each of the plurality of data chunks included in a portion of received content, and provides data chunk metadata to a file system manager that is included in a cloud server.

In some embodiments, a source system chunks data associated with the content to be archived into a plurality of data chunks, determines a corresponding chunk identifier (e.g., SHA-1 hash value) for each of the plurality of data chunks, and sends the chunk identifiers to the client-side component. Subsequently, the client-side component provides data chunk metadata to the file system manager of a cloud server.

Data chunk metadata includes the corresponding chunk identifiers, corresponding data chunk sizes, and corresponding object offsets. The data chunk metadata indicates a sequence of data chunks within an object. For example, the data chunk metadata may indicate that a first data chunk having a chunk identifier of C1 is associated with an object offset of 0 MB-1 MB and has a data chunk size of 1 MB, a second data chunk having a chunk identifier of C2 is associated with an object offset of 1 MB-2 MB and has a data chunk of 1 MB, . . . , and an 8th data chunk identifier of C8 is associated with an object offset of 7 MB-8 MB and has a data chunk size of 1 MB.

In response to receiving the data chunk metadata, a file system manager of the cloud server may determine whether any of the one or more corresponding chunk identifiers are included in a chunk metadata data structure by comparing each of the corresponding chunk identifiers to chunk identifiers included in an archive chunk metadata data structure. The archive chunk metadata data structure stores information that associates a plurality of chunk identifiers with their corresponding chunk object identifiers. This indicates that a data chunk having a particular chunk identifier is stored in a chunk object having a particular chunk object identifier. The file system manager identifies the one or more chunk identifiers that are not included in the archive chunk metadata data structure and provides to the client-side component a data structure that includes the one or more identified chunk identifiers.

The file system manager provides an encryption key and a reference to a portion of a cloud storage where the one or more data chunks corresponding to the identified chunk identifiers are to be stored. The reference to a portion of the cloud storage may identify one or more chunk objects of the cloud storage to which the one or more data chunks are to be stored. The one or more chunk objects may include one or more new chunk objects, one or more existing chunk objects, and/or one or more chunk objects yet to be created.

In response to receiving the data structure, the encryption key, and the reference, the client-side component is configured to encrypt and write one or more data chunks corresponding to the one or more identified chunk identifiers to the one or more chunk objects associated with the provided reference location. In some embodiments, the client-side component has already chunked the one or more data chunks. In some embodiments, the client-side component requests from the source system the one or more data chunks identified in the data structure.

For each received portion of content, the client-side component is configured to provide the file system manager an indication that the one or more data chunks corresponding to the one or more identified chunk identifiers were written to the provided reference location. In response, the file system manager is configured to generate metadata (e.g., tree data structure, archive chunk metadata data structure, chunk object metadata data structure) that enables the one or more written data chunks to be located at the cloud storage. After the first archive is complete, the generated metadata provides a view (partial or complete) of the source storage at the first point in time. An archive manager may subsequently generate an archive metadata object and metadata objects for the first archive and store the generated objects at cloud storage.

At 206, an extended expiration time is stored in archive metadata for each object associated with the first archive. The extended expiration time is the expiration time extension plus the expiration time associated with the first data management policy. In some embodiments, the expiration time specified by the data management policy associated with the first archive is stored in the archive metadata object associated with the first archive.

At 208, a corresponding amount of expiration time extension for one or more objects associated with a second archive of a second snapshot of a source storage is determined based at least in part on a data management policy associated with a third archive and one or more dynamically determined metrics. A data management policy associated with the third archive may indicate whether the third archive is subject to a data lock period. The one or more dynamically determined metrics may include a historical rate of data change between archives, a predicted rate of data change between archives, an amount of data change between the archives, a percentage of data change between the archives, a fragment length (e.g., the average length of contiguous logical storage), and/or a storage cost associated with storing the archive).

The archive manager may determine a corresponding extended expiration time for one or more objects associated with an archive when an archive is to be stored at the cloud storage because a data lock period associated with a data management policy and/or the one or more dynamically determined metrics may have changed since the previous archive was stored at the cloud storage. In some embodiments, the corresponding extended expiration time is determined each time an archive is stored at the cloud storage. In some embodiments, the corresponding extended expiration time is sometimes determined (e.g., every other time, more than half the time, etc.) when an archive is stored at the cloud storage. In some embodiments, the expiration time extension for one or more objects associated with a current archive is greater than the expiration time extension for one or more associated with a previous archive. In some embodiments, the expiration time extension for one or more objects associated with a current archive is equal to the expiration time extension for one or more objects associated with a previous archive. In some embodiments, the expiration time extension for one or more objects associated with a current archive is less than the expiration time extension for one or more objects associated with a previous archive, but does not expire before the expiration time for one or more objects associated with any previous archive that includes data chunk(s) referenced by one or more objects associated with the current archive.

At 210, the second archive of the second snapshot of the source storage is caused to be stored to a remote storage. A second snapshot captures a state of file system data associated with the source storage at a second point in time.

An archive manager may determine that a condition associated with the archive policy has been met and send to a client-side component coupled to the source storage a specification of content to be archived from the source storage to the remote storage. In some embodiments, the specification of content for a second archive describes an incremental archive of the source storage. An incremental archive of the source storage includes file system data that was not included in a previous archive of the source storage. In some embodiments, the specification of content for a second archive describes an incremental archive of an object included in the source storage. An incremental archive of an object includes object data that was not included in a previous archive of the object. In some embodiments, the specification of content describes a performance storage class for one or more objects stored in the source storage.

In response to receiving the specification of content from the archive manager, the client-side component is configured to perform the second archive by requesting the content from the source storage. The source storage utilizes the second snapshot to provide the requested second archive content in a plurality of portions to the client-side component.

Similar to the first archive stored at 204, the client-side component requests and receives the second archive content in a plurality of portions from the source system. For each received portion of content, the client-side component divides the received portion of content into a plurality of data chunks.

The client-side component may generate corresponding chunk identifiers (e.g., SHA-1 have value) for each of the plurality of data chunks included in a portion of received content. Data chunk metadata that includes the corresponding chunk identifiers, corresponding data chunk sizes, and corresponding object offsets are sent to a file system manager that is included in a cloud server.

In some embodiments, the source system chunks data associated with the content to be archived into a plurality of data chunks, determines a corresponding chunk identifier (e.g., SHA-1 hash value) for each of the plurality of data chunks, and sends the chunk identifiers to the client-side component. Subsequently, the client-side component provides data chunk metadata to the file system manager that is included in the cloud storage.

In response to receiving the data chunk metadata, the file system manager may determine whether any of the one or more corresponding chunk identifiers are included in an archive chunk metadata data structure by comparing each of the corresponding chunk identifiers to chunk identifiers included in the archive chunk metadata data structure.

The file system manager may identifier one or more corresponding chunk identifiers that are included in the archive chunk metadata data structure. The chunk identifiers included in the archive chunk metadata data structure indicate data chunks associated with the storage tenant that are already stored in a first performance storage class of a cloud storage. In some embodiments, portions of the second archive content were already stored in the first performance storage class of the cloud storage during a first archive of the source storage. If the client-side component were to write to the first performance storage class data chunk corresponding to chunk identifiers already included in the archive chunk metadata data structure, then the cloud storage would store duplicate copies of the same data chunks, which is an inefficient use of the cloud storage. Instead, the file system manager generates, as described herein, metadata for the second archive that references chunk objects storing data chunks included in the portion of content of the second archive. This enables an object included in the second archive to be accessed or restored without storing duplicate copies of the same data chunks.

The file system manager identifies one or more corresponding chunk identifiers that are not included in the archive chunk metadata structure. The file system manager is configured to provide to the client-side component a data structure that indicates one or more data chunks corresponding to the one or more identified chunk identifiers are to be stored to a first performance storage class of the cloud storage, an encryption key, and a reference to a portion of a cloud storage where the one or more data chunks corresponding to the one or more identified chunk identifiers are to be stored. In response, the client-side component completes the second archive in a similar manner as described for step 204. An archive manager may subsequently generate an archive metadata object and metadata objects for the second archive and store the generated objects at cloud storage.

At 212, the extended expiration time is stored in an archive metadata for each object associated with the second archive. The extended expiration time is the expiration time extension plus the expiration time associated with the second data management policy. In some embodiments, the expiration time specified by the data management policy associated with the second archive is stored in the archive metadata object associated with the second archive.

FIG. 2B is a flow diagram illustrating a process for extending a corresponding expiration time of one or more objects associated with an archive in accordance with some embodiments. In the example shown, process 200 may be implemented by an archive manager, such as archive manager 169.

A source storage (e.g., NAS device) may be configured to generate snapshots of objects stored in a storage volume of the source storage. In some embodiments, a snapshot of the storage system is performed and the storage system is the source storage. Each snapshot captures a state of an object, such as a file associated with the source storage at different points in time. An archive policy may indicate a frequency at which an archive of the source storage is to be performed (e.g., daily, weekly, monthly, etc.).

At 252, a corresponding amount of expiration time extension for one or more objects associated with a first archive of a first snapshot of the source storage is determined based at least in part on a data management policy associated with a second archive and one or more dynamically determined metrics.

The first archive is associated with a first data management policy. The first data management policy indicates an expiration time for the first archive. The expiration time associated with the first archive is based on retention period associated with the first archive and may be based on, if specified by the first data management policy, a data lock period for the first archive. In some embodiments, a data management policy indicates a retention period for one or more objects associated with the archive. In some embodiments, a data management policy indicates a corresponding data lock period for one or more objects associated with the archive.

A corresponding expiration time may be specified for one or more objects associated with the archive prior to the archive being stored in cloud storage. A subsequent incremental archive often references many of the same objects included in one or more previous archives. Instead of specifying the corresponding expiration time for one or more objects associated with the first archive to be the expiration time associated with the first data management policy, the expiration time for one or more objects associated with the first archive is extended based on in part on one or more data management policies associated with one or more subsequent archives (e.g., a corresponding data lock period associated with one or more subsequent incremental archives) and one or more dynamically determined metrics (e.g., a historical rate of data change between archives, a predicted rate of data change between archives, an amount of data change between the archives, a percentage of data change between the archives, a fragment length (e.g., the average length of contiguous logical storage), and/or a storage cost associated with storing the archive).

The extended expiration time may be determined using a model, such as a machine learning model, a rules-based model, a heuristic model, a deterministic model, etc. In some embodiments, a machine learning model is trained to determine the expiration time extension based on a plurality of previous data management policies associated with one or more archives, historical rates of data change between archives, historical fragment lengths (e.g., the average length of contiguous logical storage), and/or historical storage cost associated with storing the archive). The machine learning model may receive feedback that indicates whether the determined expiration time extension overextends expiration time, underextends the expiration time, or appropriately extends the expiration time. The machine learning model may be re-trained based on the feedback.

The machine learning model may be trained using a supervised machine learning algorithm. In some embodiments, the model is trained using a semi-supervised machine learning algorithm that utilizes one or more labeled data sets and one or more pseudo-labeled data sets. In the embodiments, the model is trained using a reinforcement machine learning algorithm. In some embodiments, the model is trained using an unsupervised machine learning algorithm.

At 254, the first archive of the first snapshot of the source storage is caused to be stored to a remote storage. An archive manager of a storage system may determine that a condition associated with the archive policy has been satisfied. The first archive may be a full archive of the first snapshot of the source storage or a full archive of an object included in the first snapshot of the source storage.

The storage system may store a tree data structure that corresponds to the first snapshot of the source storage. The storage system may traverse the tree data structure to locate the data chunks associated with the first snapshot of the source storage and send a copy of the data chunks associated with the first snapshot of the source storage to a first performance storage class of the cloud storage.

The storage system may subsequently update a backup chunk metadata data structure to associate a data chunk with a corresponding chunk object. The backup chunk metadata data structure includes a plurality of entries. Each entry associates a chunk identifier associated with a data chunk with a chunk file identifier of a chunk file storing the data chunk. The entry may be updated to associate the chunk identifier associated with the data chunk with a chunk object identifier of a chunk object storing the data chunk. In some embodiments, a copy of the data chunk is stored in the storage system and the cloud storage. The entry for the data chunk may associate the chunk identifier associated with the data chunk with a chunk file identifier of a chunk file storing the data chunk and a chunk object identifier of a chunk object storing the data chunk. In some embodiments, a data chunk is migrated from storage system to the cloud storage. The entry for the data chunk may associate the chunk identifier associated with the data chunk with a chunk object identifier of a chunk object storing the data chunk. An archive manager of the storage system may generate an archive metadata object and metadata objects for the first archive and store the generated objects at cloud storage.

At 256, the extended expiration time is stored in archive metadata for each object associated with the first archive. The extended expiration time is the expiration time extension plus the expiration time associated with the first data management policy. In some embodiments, the expiration time specified by the data management policy associated with the first archive is stored in the archive metadata object associated with the first archive.

At 258, a corresponding amount of expiration time extension for one or more objects associated with a second archive of a second snapshot of a source storage is determined based at least in part on a data management policy associated with a third archive and one or more dynamically determined metrics. A data management policy associated with the third archive may indicate whether the third archive is subject to a data lock period. The one or more dynamically determined metrics may include a historical rate of data change between archives, a predicted rate of data change between archives, an amount of data change between the archives, a percentage of data change between the archives, a fragment length (e.g., the average length of contiguous logical storage), and/or a storage cost associated with storing the archive).

The archive manager may determine a corresponding extended expiration time for one or more objects associated with an archive when an archive is to be stored at the cloud storage because the one or more dynamically determined metrics may have changed since the previous archive was stored at the cloud storage. In some embodiments, the corresponding extended expiration time is determined each time an archive is stored at the cloud storage. In some embodiments, the corresponding extended expiration time is sometimes determined (e.g., every other time, more than half the time, etc.) when an archive is stored at the cloud storage. In some embodiments, the expiration time extension for one or more objects associated with a current archive is greater than the expiration time extension for one or more objects associated with a previous archive. In some embodiments, the expiration time extension for one or more objects associated with a current archive is equal to the expiration time extension for one or more objects associated with a previous archive. In some embodiments, the expiration time extension for one or more objects associated with a current archive is less than the expiration time extension for one or more objects associated with a previous archive, but does not expire before the expiration time of any object associated with any previous archive that includes data chunk(s) referenced by one or more objects associated with the current archive.

At 260, the second archive of the second snapshot of the source storage is caused to be stored to a remote storage. An archive manager of a storage system may determine that a condition associated with the archive policy has been satisfied. The second archive may be an incremental archive of the second snapshot of the source storage, that is, the incremental archive of the second snapshot of the source storage includes data that not archived in the first archive of the first snapshot of the source storage. In some embodiments, the second archive is an incremental archive of an object included in the second snapshot of the source storage.

The storage system may store a tree data structure that corresponds to the second snapshot of the source storage. The storage system may traverse the tree data structure associated with the second snapshot of the source storage and identify the chunk identifiers associated with the data chunks associated with the second snapshot of the source storage. The storage system may compare each of the identified chunk identifiers with chunk identifiers included in the backup chunk metadata data structure. In the event an entry of the backup chunk metadata data structure corresponding to the identified data chunk stores a chunk object identifier of a chunk object storing the identified data chunk, the storage system does not provide the identified data chunk to the chunk storage. Instead, the storage system updates a node of the tree data structure that corresponds to the identified data chunk to reference the chunk object storing the identified data chunk.

In the event an entry of the backup chunk metadata data structure corresponding to the identified data chunk does not store a chunk object identifier of a chunk object storing the identified data chunk, the storage system sends a copy of the identified data chunk to a first performance storage class of the cloud storage and updates the backup chunk metadata data structure entry corresponding to the identified data chunk to reference the chunk object storing the identified data chunk.

In some embodiments, as discussed herein, a duplicate of the identified data chunk is stored in a new chunk object. The metadata associated with the second snapshot (e.g., tree data structures, metadata object) will reference the duplicate identified data chunk stored in the new chunk object and not reference the pre-existing chunk object.

An archive manager may generate an archive metadata object and metadata objects for the second archive and store the generated objects at cloud storage.

At 262, the extended expiration time is stored in archive metadata for each object associated with the second archive. The extended expiration time is the expiration time extension plus the expiration time associated with the second data management policy. In some embodiments, the extended expiration time for one or more objects associated with the second archive is stored in the archive metadata object associated with the second archive. In some embodiments, the expiration time specified by the data management policy associated with the second archive is stored in the archive metadata object associated with the second archive.

Figure 3:
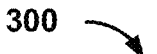
FIG. 3 is a flow diagram illustrating a process for establishing a corresponding expiration time for one or more objects associated with an archive in accordance with some embodiments.

FIG. 3 is a flow diagram illustrating a process for establishing a corresponding expiration time for one or more objects associated with an archive in accordance with some embodiments. In some embodiments, process 300 is implemented by an archive manager, such as archive managers 118, 169. In some embodiments, process 300 is implemented to perform some or all of steps 202, 208, 252, 258.

At 302, an archive that includes one or more objects comprised of one or more corresponding chunk objects is determined to be stored. A data management policy associated with an archive may specify a retention period for an archive, a retention period for an object associated with an archive, a data lock period for an archive, and/or a data lock period for an object associated with an archive.

At 304, it is determined whether the archive is subject to a data lock period. An archive manager inspects the data management policy to determine whether the archive is subject to a data lock period. In the event the data management policy indicates that the archive is subject to a data lock period, process 300 proceeds to 306. In the event the data management policy indicates that the archive is not subject to a data lock period, process 300 proceeds to 308.

At 306, an extended expiration time is established for one or more objects associated with the archive. The expiration time for the one or more objects associated with the archive is extended based in part on one or more data management policies associated with one or more subsequent archives (e.g., a corresponding data lock period associated with one or more subsequent incremental archives) and one or more dynamically determined metrics (e.g., a historical rate of data change between archives, a predicted rate of data change between archives, an amount of data change between the archives, a percentage of data change between the archives, a fragment length (e.g., the average length of contiguous logical storage), and/or a storage cost associated with storing the archive).

At 308, an expiration time is established for one or more objects associated with the archive. The archive is associated with a data management policy. The data management policy specifies a retention period and may specify a data lock period. The expiration time for one or more objects associated with an archive that is subject to a retention period, but not subject to a data lock period is the expiration time of the retention period as specified by the data management policy associated with the archive.

Figure 4:
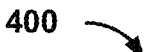
FIG. 4 is a flow diagram illustrating a process for updating a corresponding expiration time for one or more objects associated with an archive in accordance with some embodiments.

FIG. 4 is a flow diagram illustrating a process for updating a corresponding expiration time for one or more objects associated with an archive in accordance with some embodiments. In some embodiments, process 400 is implemented by an archive manager, such as archive managers 118, 169.

At 402, expiration times of one or more objects associated with an archive are monitored. After the archive and the one or more objects associated with the archive have been stored at the cloud storage, the corresponding expiration times associated with the one or more objects associated with the archive may be updated at a later point in time.

In some embodiments, the later point in time is a point in time predicted by a model. The predicted point in time may be based on the rate of data change between archives. In some embodiments, the later point in time is a threshold amount of time before the extended expiration time expires. In some embodiments, the later point in time is the extended expiration time.

At the later point in time, the archive manager determines whether to update the corresponding expiration times for one or more objects associated with the archive, and if necessary, the archive manager further extends the corresponding expiration times for one or more objects associated with the archive that are referenced by one or more objects having an expiration time that exceeds the corresponding expiration times for one or more objects associated with the archive. This may improve costs savings associated with storing data in cloud storage while balancing the number of API calls.

At 404, it is determined whether one or more metrics indicate to update the corresponding expiration times for one or more objects associated with the archive. The one or more metrics may include a historical rate of data change between archives, a predicted rate of data change between archives, a fragment length (e.g., the average length of contiguous logical storage), and/or a storage cost associated with storing the archive), etc.

In the event the one or more metrics indicate to update the corresponding expiration times for one or more objects associated with the archive, process 400 proceeds to 406. In the event the one or more metrics do not indicate to update the corresponding expiration times for one or more objects associated with the archive, process 400 proceeds to 408.

At 406, the corresponding expiration times for one or more objects associated with the archive are updated. At 408, the corresponding expiration times for one or more objects associated with the archive are maintained.

FIG. 5 is a flow diagram illustrating a process for performing garbage collection in accordance with some embodiments. In some embodiments, process 500 is implemented by an archive manager, such as archive managers 118, 169.

At 502, it is determined that an expiration time associated with an archive has expired. A data management policy associated with the archive may specify the expiration time. In some embodiments, the expiration time associated with the archive is the expiration time of all the objects associated with the archive. In some embodiments, the expiration time associated with an archive is an expiration time of some of the objects included in the archive. In some embodiments, the expiration time associated with an archive is an expiration time of none of the objects included in the archive (e.g., all of the objects included in the archive are referenced by a subsequent archive).

At 504, a garbage collection process is performed. A garbage collection process may read the plurality of archive metadata objects stored in cloud storage. Each of the archive metadata objects is associated with a corresponding archive and stores a corresponding expiration time. In the event an expiration time associated with an archive has expired, the objects associated with the archive (e.g., chunk object(s), metadata object(s), archive metadata object) may be subject to garbage collection.

The garbage collection process may be periodically performed (e.g., every four hours). The garbage collection process may be comprised of two sub-processes. The first sub-process is configured to delete unreferenced data chunks from a chunk object. The second sub-process is configured to delete references to data chunks from metadata objects.

The first sub-process may be performed by scanning the plurality of metadata objects and reading the data blocks that correspond to leaf nodes of a metadata object. Some of the data blocks of the metadata objects reference data chunks included in a chunk object. The garbage collection process is configured to count the number of data chunks included in a chunk object that are referenced.

The total number of data chunks stored in a chunk object is stored in a chunk object metadata data structure. The chunk object metadata data structure indicates the number of data chunks that are stored in each chunk object, when each chunk object was created, and/or when each chunk object was modified, if at all. The chunk object metadata data structure may be stored by a storage system or a cloud server.

In some embodiments, in the event a number of referenced data chunks is less than a threshold number of data chunks, then the unreferenced data chunks are deleted from the chunk object. In the event the number of referenced data chunks is not less than the threshold number of data chunks, then the unreferenced data chunks are not deleted from the chunk object.

In some embodiments, in the event a percentage of referenced data chunks is less than a threshold percentage, then the unreferenced data chunks are deleted from the chunk object. In the event the percentage of referenced data chunks is not less than the threshold percentage, then the unreferenced data chunks are not deleted from the chunk object.

The second sub-process may be performed by deleting the one or more data blocks from a metadata object that are exclusively referenced by an expired archive. This causes one or more data chunks referenced by the one or more deleted data blocks to become unreferenced.

Figure 6:
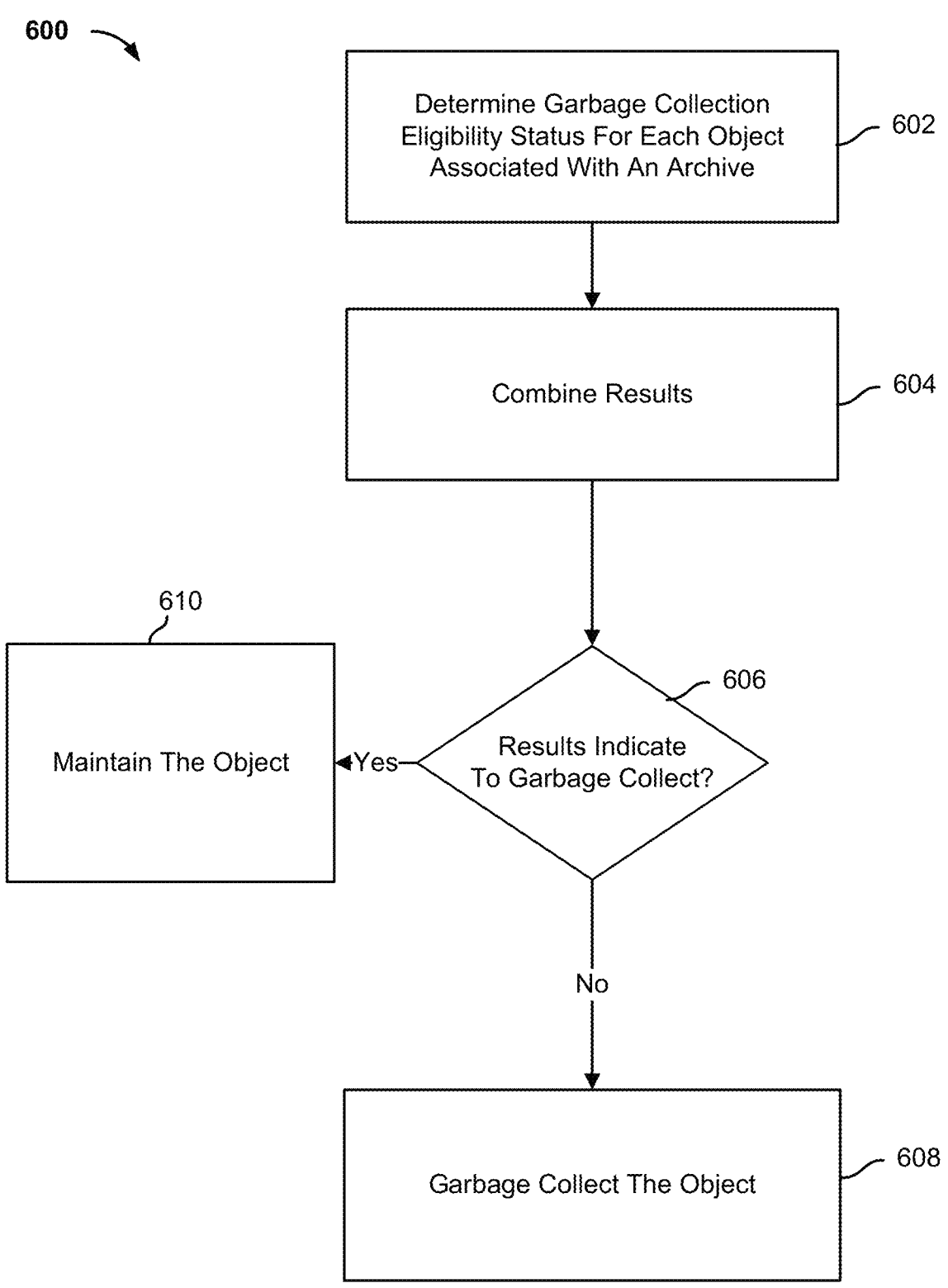
FIG. 6 is a flow diagram illustrating a process for performing garbage collection in accordance with some embodiments.

FIG. 6 is a flow diagram illustrating a process for performing garbage collection in accordance with some embodiments. In some embodiments, process 600 is implemented by an archive manager, such as archive managers 118, 169. In some embodiments, process 600 is implemented to perform some or all of step 504 of process 500.

At 602, a garbage collection eligibility status (e.g., eligible, not eligible) for each object associated with an archive with respect to a data management policy associated with the archive is determined. A data management policy associated with the archive may specify the expiration time. The storage system may implement a plurality of workers to determine whether an object and its associated chunks objects can be deleted. An archive manager may assign a corresponding worker of the plurality of workers to one of the archives stored at the cloud storage. A corresponding worker determines a garbage collection eligibility status for each of the objects associated with an assigned archive and provides the determined garbage collection eligibility statuses to the archive manager. A worker may determine that an object associated with an archive may be eligible for garbage collection in the event the expiration time associated with the archive that includes the object has expired. A worker may determine that an object associated with a previous archive may be ineligible for garbage collection in the event the expiration time associated with a subsequent archive has not expired and an object associated with the subsequent archive includes one or more references to one or more data chunks included in the object associated with the previous archive.

At 604, the results are combined. The archive manager combines the garbage collection eligibility statuses of the objects associated with the plurality of archives. For example, a first worker associated with a first archive may determine that a first object may be eligible for garbage collection because the expiration time associated with the first archive has expired and a second worker associated with a second archive may determine that the first object may be ineligible for garbage collection because the expiration time associated with the second archive has not expired and a second object associated with the second archive includes one or more references to one or more data chunks included in the object associated with the first archive.

At 606, it is determined whether the combined result for an object indicates to garbage collect the object. An object may be associated with one or more archives because the chunk objects included in an object associated with a first archive may be referenced by one or more other objects associated with other archives. In the event a first worker indicates that a first object associated with a first archive may be eligible for garbage collection and none of the one or more workers associated with one or more other archives indicate that one or more objects reference data chunks associated with the first object, the archive manager determines that the one or more chunk objects associated with the first object are eligible for garbage collection. In the event a first worker indicates that a first object associated with a first archive may be eligible for garbage collection and at least one of the one or more workers associated with one or more other archives indicates that one or more objects reference data chunks associated with the first object, the archive manager determines that the one or more chunk objects associated with the first object are not eligible for garbage collection.

In the event it is determined that the combined result for an object indicates to garbage collect the object, process 600 proceeds to 608.

In the event it is determined that the combined output for an object does not indicate to garbage collect the object, process 600 proceeds to 610.

At 608, the object is garbage collected. At 610, the object is maintained in cloud storage.

Figure 7A:
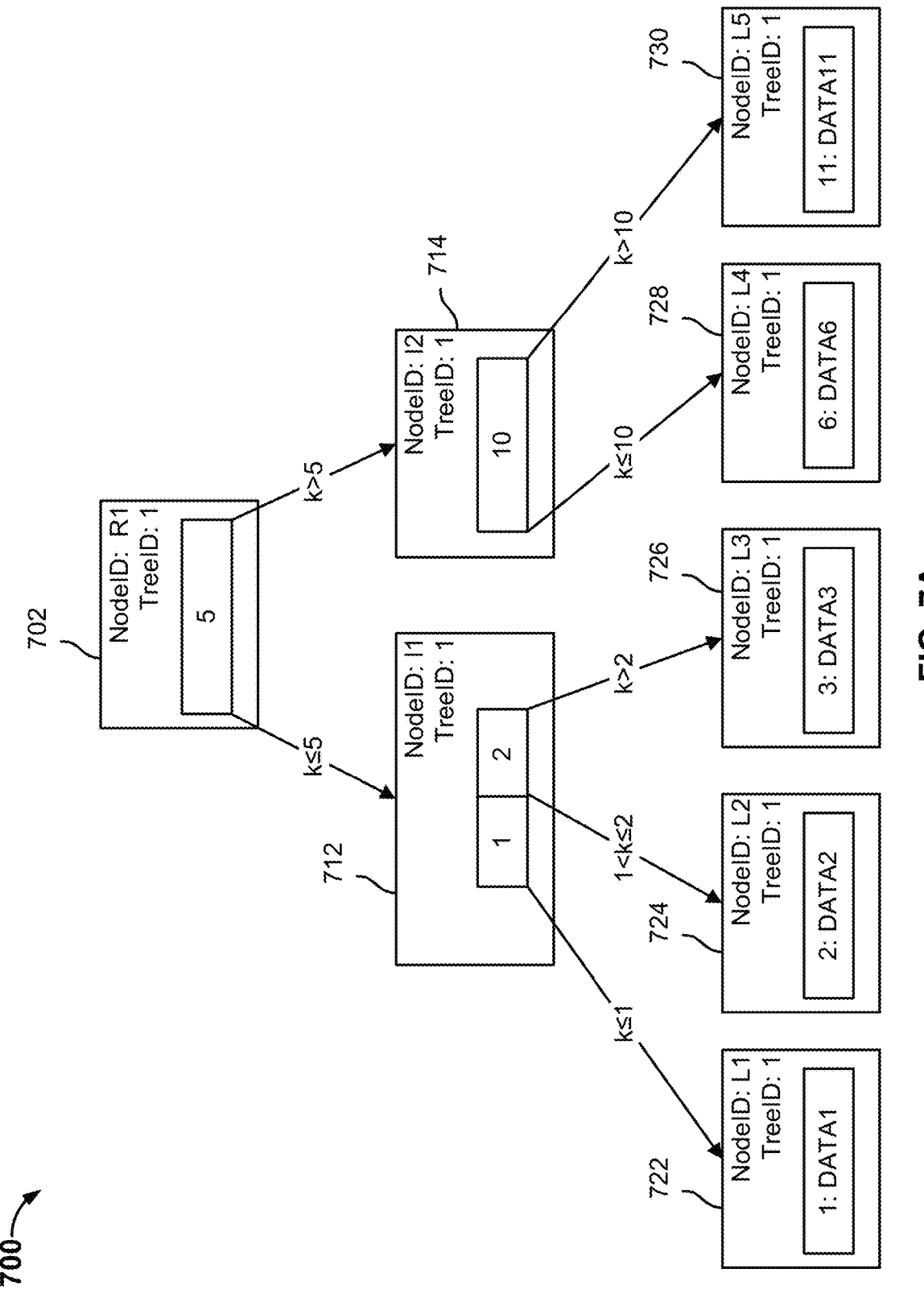
FIG. 7A is a block diagram illustrating an embodiment of a tree data structure.

FIG. 7A is a block diagram illustrating an embodiment of a tree data structure. A tree data structure may be used to represent a view of file system data that is stored on a storage system, such as storage system 105 at a particular point in time, such as time $t_0$. The file system data may include metadata for a distributed file system and may include information, such as chunk identifier, chunk offset, file size, directory structure, file permissions, physical storage locations of the content files, etc. A file system manager, such as file system manager 115 or file system manager 167, may generate tree data structure 700 in response to ingesting a cohort of data from a source system. In some embodiments, file system manager 115 ingests a cohort of data from source system 103 via client-side component 104. In some embodiments, file system manager 167 ingests a cohort of data from source system 103.

Tree data structure 700 may represent a view of file system associated with a data management operation performed for a source system. In some embodiments, tree data structure 700 represents a view of file system data that is archived (e.g., a full archive) from a source system. In some embodiments, tree data structure 700 represents a view of file system data that is backed up from a source system (e.g., a full backup). In some embodiments, tree data structure 700 represents a view of file system data that is replicated (e.g., full replication) from a source system. In some embodiments, tree data structure 700 represents a view of file system data that is migrated (e.g., full migration) from a source system. In some embodiments, tree data structure 700 represents a view of file data that is tiered from a source system.

Tree data structure 700 is comprised of a snapshot tree that includes root node 702, intermediate nodes 712, 714, and leaf nodes 722, 724, 726, 728, 730. Although tree data structure 700 includes one intermediate level between root node 702 and leaf nodes 722, 724, 726, 728, 730, any number of intermediate levels may be implemented. The snapshot tree in conjunction with a plurality of metadata structures may provide a complete view of the source system for a particular point in time.

A root node is the starting point of a snapshot tree and include pointers to one or more other nodes. An intermediate node is a node to which another node points (e.g., root node, other intermediate node) and includes one or more pointers to one or more other nodes. A leaf node is a node of the snapshot tree that does not have child nodes of the snapshot tree. Each node of the tree structure includes a view identifier of a view with which the node is associated (e.g., Tree ID).

A leaf node may be configured to store key-value pairs of file system data. A data key k is a lookup value by which a particular leaf node may be accessed. For example, "1" is a data key that may be used to lookup "DATA1" of leaf node 722. The data key k may correspond to a brick number of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the content files, etc.). A leaf node may store a data key k and a pointer to a location that stores the value associated with the data key. In some embodiments, a leaf node is configured to store the data associated with an object when the data is less than or equal to a limit size (e.g., 256 kB). In some embodiments, a leaf node includes a pointer to a metadata structure (e.g., blob structure) when the size of data associated with an object is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 702 may include a node key of "5." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 702 would be traversed to intermediate node 712 because the data keys of "1," "2," and "3" are less than or equal to the node key "5." To find a leaf node storing a value associated with a data key of "6" or "11," the second branch of root node 702 would be traversed to intermediate node 714 because data keys "6" and "11" are greater than the node key of "5."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "5." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key and may be used to determine which branch of a node is associated with a non-numerical data key. For example, a hash function may be applied to a non-numerical data key, resulting in a corresponding hash value; the hash value may be used to select which branch of a node is associated with the corresponding non-numerical data key. Accordingly, it can be determined that a first bucket is associated with a first branch of a node and a second bucket is associated with a second branch of the node.

In the example shown, root node 702 includes pointers to intermediate node 712 and intermediate node 714. Root node 702 includes a Node ID of "R1" and a Tree ID of "1." The Node ID identifies the name of the node. The Tree ID identifies the view with which the node is associated. When a change is made to data stored in a leaf node as described with respect to FIGS. 7B, 7C, and 7D, the Tree ID is used to determine whether a copy of a node is to be made.

Root node 702 includes a node key that divides a set of pointers into two different subsets. Leaf nodes (e.g., "1-3") with a data key k that is less than or equal to the node key are associated with a first branch and leaf nodes (e.g., "6, 11") with a data key k that is greater than the node key are associated with a second branch. Leaf nodes with a data key of "1," "2," or "3" may be found by traversing tree data structure 700 from root node 702 to intermediate node 712 because the data keys have a value that is less than or equal to the node key. Leaf nodes with a data key of "6" or "11" may be found by traversing tree data structure 700 from root node 702 to intermediate node 714 because the data keys have a value that is greater than the node key.

Root node 702 includes a first set of pointers. The first set of pointers associated with a data key less than the node key (e.g., "1", "2," or "3") indicates that traversing tree data structure 700 from root node 702 to intermediate node 712 will lead to a leaf node with a data key of "1," "2," or "3." Intermediate node 714 includes a second set of pointers. The second set of pointers associated with a data key greater than the node key indicates that traversing tree data structure 700 from root node 702 to intermediate node 714 will lead to a leaf node with a data key of "6" or "11."

Intermediate node 712 includes pointers to leaf nodes 722, 724, 726. Intermediate node 712 includes a Node ID of "I1" and a Tree ID of "1." Intermediate node 712 includes a first node key of "1" and a second node key of "2." The data key k for leaf node 722 is a value that is less than or equal to the first node key. The data key k for leaf node 724 is a value that is greater than the first node key and less than or equal to the second node key. The data key k for leaf node 726 is a value that is greater than the second node key. The pointer to leaf node 722 indicates that traversing tree data structure 700 from intermediate node 712 to leaf node 722 will lead to the node with a data key of "1." The pointer to leaf node 724 indicates that traversing tree data structure 700 from intermediate node 712 to leaf node 724 will lead to the node with a data key of "2." The pointer to leaf node 726 indicates that traversing tree data structure 700 from intermediate node 712 to leaf node 726 will lead to the node with a data key of "3."

Intermediate node 714 includes pointers to leaf nodes 728, 730. Intermediate node 714 includes a Node ID of "I2" and a Tree ID of "1." Intermediate node 714 includes a node key of "10." The data key k for leaf node 728 is a value that is less than or equal to the node key. The data key k for leaf node 730 is a value that is greater than the node key. The pointer to leaf node 728 indicates that traversing tree data structure 700 from intermediate node 714 to leaf node 728 will lead to the node with a data key of "6." The pointer to leaf node 730 indicates that traversing tree data structure 700 from intermediate node 714 to leaf node 730 will lead to the node with a data key of "11."

Leaf nodes 722, 724, 726, 728, 730 include respective data key-value pairs of "1: DATA1," "2: DATA2," "3: DATA3," "6: DATA6," "11: DATA11." Leaf nodes 722, 724, 726, 728, 730 include respective Node IDs of "L1," "L2," "L3," "L4," "L5." Leaf nodes 722, 724, 726, 728, 730 all include a Tree ID of "1." In some embodiments, leaf nodes 722, 724, 726, 728, or 730 are configured to store metadata. In other embodiments, leaf nodes 722, 724, 726, 728, or 730 are configured to store content data when the size of the object is less than or equal to a limit size. In other embodiments, leaf nodes 722, 724, 726, 728, or 730 are inodes and are configured to store a pointer to or an identifier of a respective object metadata structure (e.g., object metadata tree).

Figure 7B:
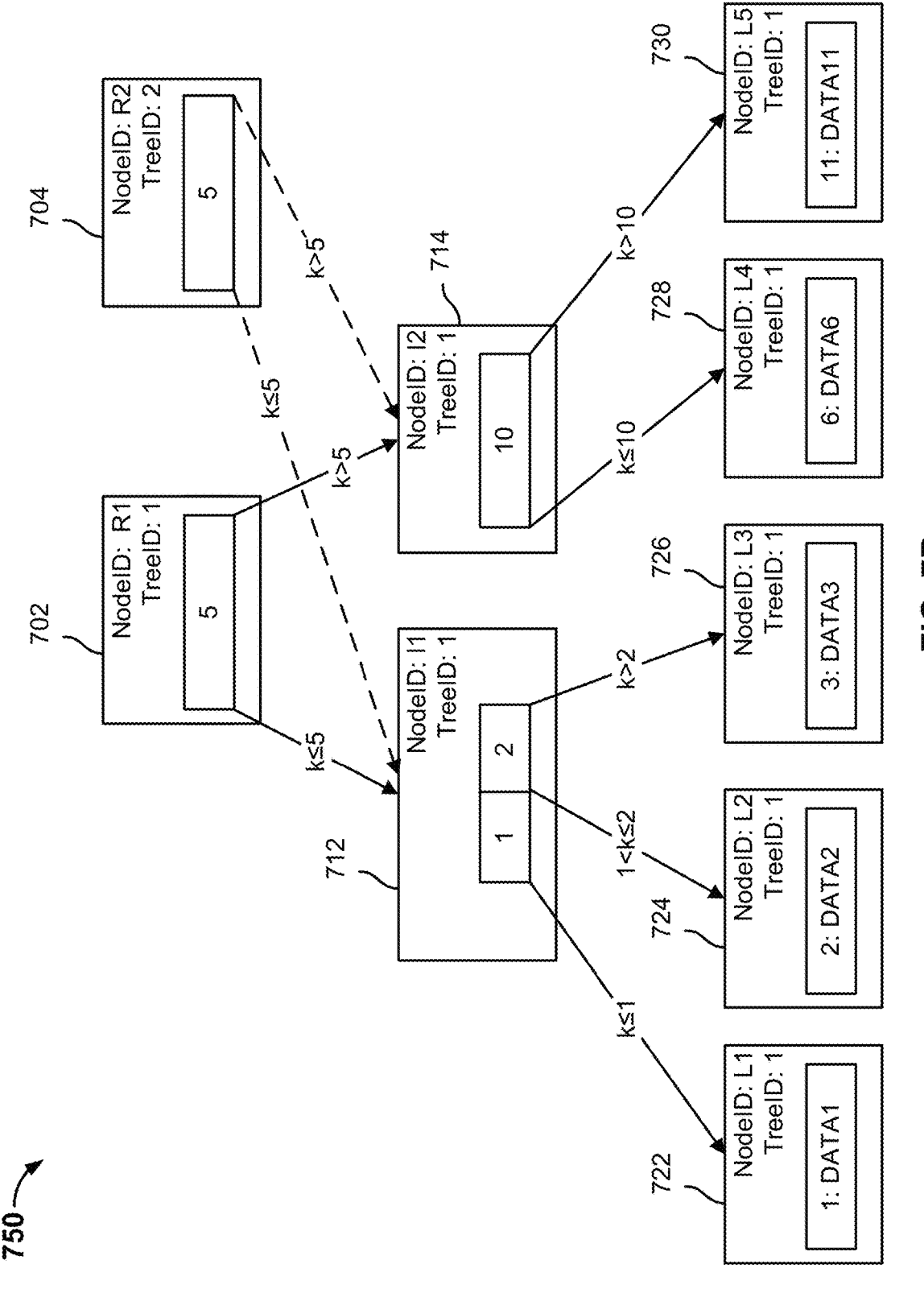
FIG. 7B is a block diagram illustrating an embodiment of a cloned tree data structure.

FIG. 7B is a block diagram illustrating an embodiment of a cloned tree data structure. A snapshot tree may be cloned and added to a tree data structure when a subsequent data management operation is performed. For example, a data management operation may include an incremental archive of a source system, an incremental backup or a source system, a migration of backed up data, a restoration of backed up data, a replication of backed up data, etc. In some embodiments, tree data structure 750 is created by a file system manager, such as file system manager 115 or file system manager 167.

In the example shown, tree data structure 750 includes root nodes 702, 704, intermediate nodes 712, 714, and leaf nodes 722, 724, 726, 728, and 730. Tree data structure 750 can be used to capture different versions of file system data at different moments in time. A tree data structure may also efficiently locate desired metadata by traversing a particular version of a snapshot tree included in the tree data structure. In some embodiments, the tree data structure allows a chain of snapshot trees to be linked together by allowing a node of a later version of a snapshot tree to reference a node of a previous version of a snapshot tree. This may correspond to a scenario where a full archive or a full backup of a source system is performed and then subsequently a plurality of incremental archives or incremental backups of the source system is performed.

In the example shown, a snapshot tree with root node 704 is linked to a snapshot tree with root node 702. In some embodiments, each time a data management operation is performed, a new root node is created and the new root node includes the same set of pointers included in the previous root node, that is the new root node of the snapshot tree may be linked to one or more intermediate nodes associated with a previous snapshot tree. The new root node also includes a different Node ID and a different Tree ID. In some embodiments, each time a data management operation is completed, a new root node is created and the new root node includes the same set of pointers included in the previous root node.

In some embodiments, a root node is associated with a current view of the file system data. A current view may still accept one or more changes to the data. In the example shown, root node 704 is associated with a current view of the file system data. In other embodiments, a root node is associated with a snapshot view of the file system data. A snapshot view may represent a state of the file system data at a particular moment in time in the past and is not updated. In the example shown, root node 702 is associated with a snapshot view of the file system data.

To generate a snapshot tree corresponding to an incremental data management operation at $t_1$, root node 702 is cloned, i.e., copied. In the example shown, root node 704 is a copy of root node 702. Similar to root node 702, root node 704 includes the same pointers as root node 702, but includes a different Node ID and a different Tree ID. Root node 704 includes a first set of pointers to intermediate node 712. The first set of pointers associated with a data key k less than or equal to the node key (e.g., "1," "2," or "3") indicates that traversing tree data structure 750 from root node 704 to intermediate node 712 will lead to a leaf node with a data key of "1," "2," or "3." Root node 704 includes a second set of pointers to intermediate node 714. The second set of pointers associated with a data key k greater than the node key indicates that traversing tree data structure 750 from root node 704 to intermediate node 714 will lead to a leaf node with a data key of "6" or "11." Root node 704 includes a Node ID of "R2" and a Tree ID of "2."

Figure 7C:
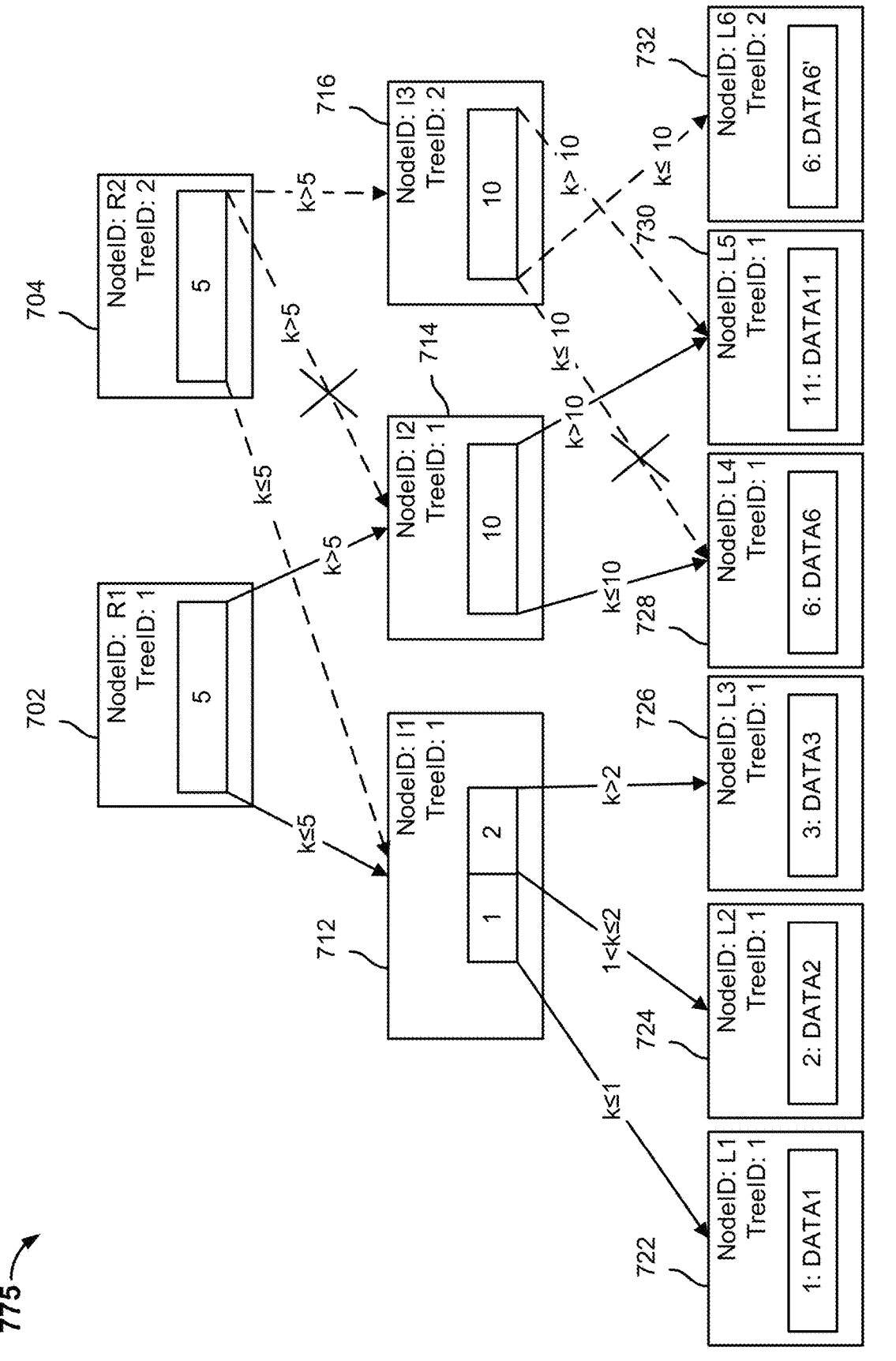
FIG. 7C is a block diagram illustrating an embodiment of modifying a cloned tree data structure.

FIG. 7C is a block diagram illustrating an embodiment of modifying a cloned tree data structure. In the example shown, tree data structure 775 may be modified by a file system manager, such as file system manager 115 or file system manager 167. A snapshot tree with a root node 704 may be a current view of the file system data, for example, at time $t_1$.

In the example shown, the value "DATA6" has been modified to be "DATA6'." In some embodiments, the value of a key value pair has been modified. In other embodiments, the value of the key value pair is the file data of associated with a content file that is smaller than or equal to a limit size. In other embodiments, the value of the key value pair points to a different metadata structure (e.g., a metadata structure corresponding to a different version of a file). The different metadata structure may be a modified version of the metadata structure to which the leaf node previously pointed.

To modify the snapshot tree at $t_1$, the file system manager starts at root node 704 because that is the root node associated with the snapshot tree at time $t_1$. The value "DATA6" is associated with the data key "6." The file system manager traverses tree data structure 775 from root node 704 until it reaches a target node, in this example, leaf node 728. The file system manager compares the Tree ID at each intermediate node and leaf node with the Tree ID of the root node. In the event the Tree ID of a node matches the Tree ID of the root node, the file system manager proceeds to the next node. In the event the Tree ID of a node does not match the Tree ID of the root node, a shadow copy of the node with the non-matching Tree ID is made. A shadow copy is a copy of a node and includes the same pointers as the copied node, but includes a different Node ID and Tree ID. For example, to reach a leaf node with a data key of "6," the file system manager begins at root node 704 and proceeds to intermediate node 714. The file system manager compares the Tree ID of intermediate node 714 with the Tree ID of root node 704, determines that the Tree ID of intermediate node 714 does not match the Tree ID of root node 704, and creates a copy of intermediate node 714. The intermediate node copy 716 includes the same set of pointers as intermediate node 714, but includes a Tree ID of "2" to match the Tree ID of root node 704. The file system manager updates a pointer of root node 704 to point to intermediate node 716 instead of pointing to intermediate node 714. The file system manager traverses tree data structure 775 from intermediate node 716 to leaf node 728, determines that the Tree ID of leaf node 728 does not match the Tree ID of root node 704, and creates a copy of leaf node 728. Leaf node copy 732 stores the modified value "DATA6'" and includes the same Tree ID as root node 704. The file system manager updates a pointer of intermediate node 716 to point to leaf node 732 instead of pointing to leaf node 728. In some embodiments, leaf node 732 stores the value of a key value pair that has been modified. In other embodiments, leaf node 732 stores the modified data associated with a content file that is smaller than or equal to a limit size.

Figure 7D:
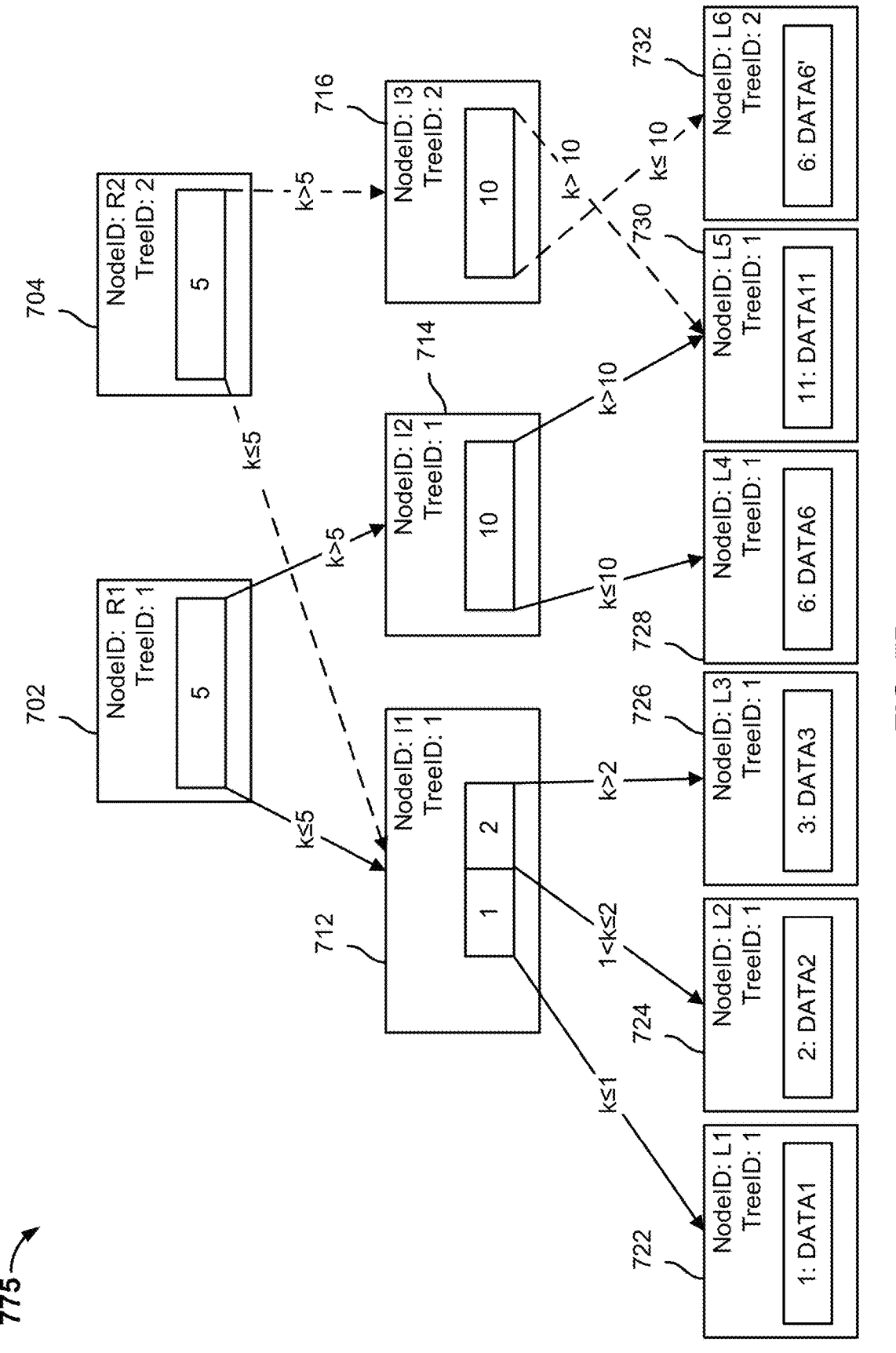
FIG. 7D is a block diagram illustrating an embodiment of a modified tree data structure.

FIG. 7D is a block diagram illustrating an embodiment of a modified tree data structure. Tree data structure 775 shown in FIG. 7D illustrates a result of the modifications made to a snapshot tree as described with respect to FIG. 7C.

Figure 8A:
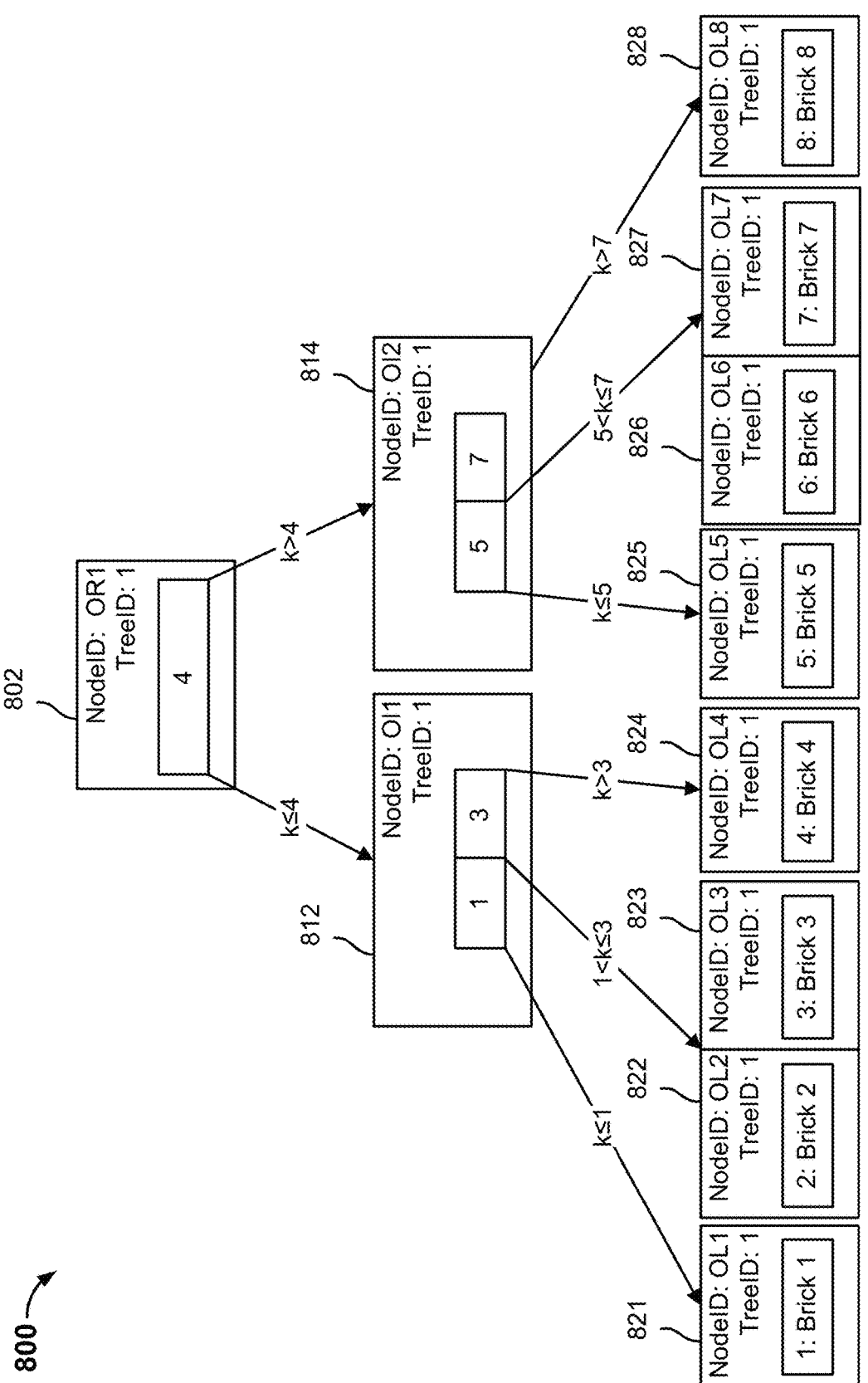
FIG. 8A is a block diagram illustrating an embodiment of a tree data structure.

FIG. 8A is a block diagram illustrating an embodiment of a tree data structure. In some embodiments, tree data structure 800 is created by a file system manager, such as file system manager 115 or file system manager 167. Tree data structure 800 may be used to organize the metadata and data content associated with an object, an object file, or a content file. Tree data structure may be referred to as a metadata structure, an object file metadata structure, or a file metadata structure. In the example shown, tree data structure 800 corresponds to the contents of an object file.

A leaf node of a snapshot tree associated with file system data, such as a leaf node of tree data structures 700, 750, 775, may include a pointer to a tree data structure that stores metadata corresponding to an object file, such as tree data structure 800. A tree data structure corresponding to an object file and storing the file metadata associated with the object file is a snapshot tree, but is used to organize the data chunks associated with the object file (e.g., data components) that are stored on the storage system.

A tree data structure corresponding to an object file at a particular point in time (e.g., a particular version) may be comprised of a root node, one or more levels of one or more intermediate nodes, and one or more leaf nodes. In some embodiments, a tree data structure corresponding to an object file is comprised of a root node and one or more leaf nodes without any intermediate nodes. Tree data structure 800 may be a snapshot of an object file at a particular point in time t, for example at time $t_0$. In some embodiments, tree data structure 800 corresponds to a full archive of an object file. In some embodiments, tree data structure 800 corresponds to a full backup of the object file.

In the example shown, tree data structure 800 includes object root node 802, object intermediate nodes 812, 814, and object leaf nodes 821, 822, 823, 824, 825, 826, 827, 828. Similar to the snapshot trees described above, each node includes a "Node ID" that identifies the node and a "Tree ID" that identifies a view with which the node is associated (e.g., a version of the content file). Root node 802 includes pointers to intermediate nodes 812, 814. Root node 802 includes a Node ID of "OR1" and a Tree ID of "1."

In the example shown, intermediate node 812 includes respective pointers to leaf nodes 821, 822, 823, 824. Intermediate node 812 includes a Node ID of "OI1" and a Tree ID of "1." Intermediate node 812 includes a first node key and a second node key. The data key k for leaf node 821 is a value that is less than or equal to the first node key. The data key for leaf nodes 822, 823 is a value that is greater than the first node key and less than or equal to the second node key. The data key for leaf node 824 is a value that is greater than the second node key. The pointer to leaf node 821 indicates that traversing tree data structure 300 from intermediate node 812 to leaf node 821 will lead to the node with a data key of "1." The pointer to leaf node 822 indicates that traversing tree data structure 800 from intermediate node 812 to leaf node 822 will lead to the node with a data key of "2." The pointer to leaf node 823 indicates that traversing tree data structure 800 from intermediate node 812 to leaf node 823 will lead to the node with a data key of "3." The pointer to leaf node 824 indicates that traversing tree data structure 300 from intermediate node 812 to leaf node 824 will lead to the node with a data key of "4."

In the example shown, intermediate node 814 includes respective pointers to leaf nodes 825, 826, 827, 828. Intermediate node 814 includes a Node ID of "OI2" and a Tree ID of "1." Intermediate node 814 includes a first node key and a second node key.

The data key k for leaf node 825 is a value that is less than or equal to the first node key. The data key for leaf nodes 826, 827 is a value that is greater than the first node key and less than or equal to the second node key. The data key for leaf node 828 is a value that is greater than the second node key. The pointer to leaf node 825 indicates that traversing tree data structure 300 from intermediate node 814 to leaf node 825 will lead to the node with a data key of "5." The pointer to leaf node 826 indicates that traversing tree data structure 300 from intermediate node 814 to leaf node 826 will lead to the node with a data key of "6." The pointer to leaf node 827 indicates that traversing tree data structure 800 from intermediate node 814 to leaf node 827 will lead to the node with a data key of "7." The pointer to leaf node 828 indicates that traversing tree data structure 800 from intermediate node 814 to leaf node 828 will lead to the node with a data key of "8."

Leaf node 821 includes a data key-value pair of "1: Brick 1." "Brick 1" is a brick identifier that identifies the data brick associated with one or more data chunks of a content file corresponding to tree data structure 800. Leaf node 821 includes a Node ID of "OL1" and a Tree ID of "1."

Leaf node 822 includes a data key-value pair of "2: Brick 2." "Brick 2" is a brick identifier that identifies the data brick associated with one or more data chunks of a content file corresponding to tree data structure 800. Leaf node 822 includes a Node ID of "OL2" and a Tree ID of "1." In this example, both leaf nodes 822, 823 have a key value that is less than or equal to 3 and greater than 1. A file system manager may traverse to leaf node 822 or leaf node 823 based on the corresponding key associated with leaf node 822 and leaf node 823. For example, the file system manager may receive a request to return the value associated with a data key "2." In response to the request, the file system manager may traverse tree data structure 800 to leaf node 822. A file system manager may receive a request to return the value associated with a data key "3." In response to the request, the file system manager may traverse tree data structure 800 to leaf node 823.

Leaf node 823 includes a data key-value pair of "3: Brick 3." "Brick 3" is a brick identifier that identifies the data brick associated with one or more data chunks of an object file corresponding to tree data structure 800. Leaf node 823 includes a Node ID of "OL3" and a Tree ID of "1."

Leaf node 824 includes a data key-value pair of "4: Brick 4." "Brick 4" is a brick identifier that identifies the data brick associated with one or more data chunks of an object file corresponding to tree data structure 800. Leaf node 824 includes a Node ID of "OL4" and a Tree ID of "1."

Leaf node 825 includes a data key-value pair of "5: Brick 5." "Brick 5" is a brick identifier that identifies the data brick associated with one or more data chunks of an object file corresponding to tree data structure 800. Leaf node 825 includes a Node ID of "OL5" and a Tree ID of "1."

Leaf node 826 includes a data key-value pair of "6: Brick 6." "Brick 6" is a brick identifier that identifies the data brick associated with one or more data chunks of an object file corresponding to tree data structure 800. Leaf node 826 includes a Node ID of "OL6" and a Tree ID of "1." In this example, both leaf nodes 826, 827 have a key value that is less than or equal to 7 and greater than 5. A file system manager may traverse tree data structure 800 to leaf node 826 or leaf node 827 based on the corresponding key associated with leaf node 826 and leaf node 827. For example, the file system manager may receive a request to return the value associated with a data key "6." In response to the request, the file system manager may traverse tree data structure 800 to leaf node 826. The file system manager may receive a request to return the value associated with a data key "7." In response to the request, the file system manager may traverse tree data structure 800 to leaf node 827.

Leaf node 827 includes a data key-value pair of "7: Brick 7." "Brick 7" is a brick identifier that identifies the data brick associated with one or more data chunks of a content file corresponding to tree data structure 800. Leaf node 827 includes a Node ID of "OL7" and a Tree ID of "1."

Leaf node 828 includes a data key-value pair of "8: Brick 8." "Brick 8" is a brick identifier that identifies the data brick associated with one or more data chunks of a content file corresponding to tree data structure 800. Leaf node 828 includes a Node ID of "OL8" and a Tree ID of "1."

An object file may be comprised of one or more chunk files. A chunk file is comprised of a plurality of data chunks. A brick may be associated with one or more data chunks. In the example shown, leaf nodes 821, 822, 823, 824, 825, 826, 827, 828 each store a corresponding brick identifier. For each of the one or more data chunks associated with a data brick, the data brick stores information that associates an object offset for the data chunk with an extent for the data chunk and a chunk file identifier storing the data chunk.

In some embodiments, data chunks associated with an object file are stored in one or more chunk objects stored in cloud storage. Instead of storing information that associates a data brick with a chunk file, the data brick stores information that associates one or more data chunks with one or more chunk objects.

Figure 8B:
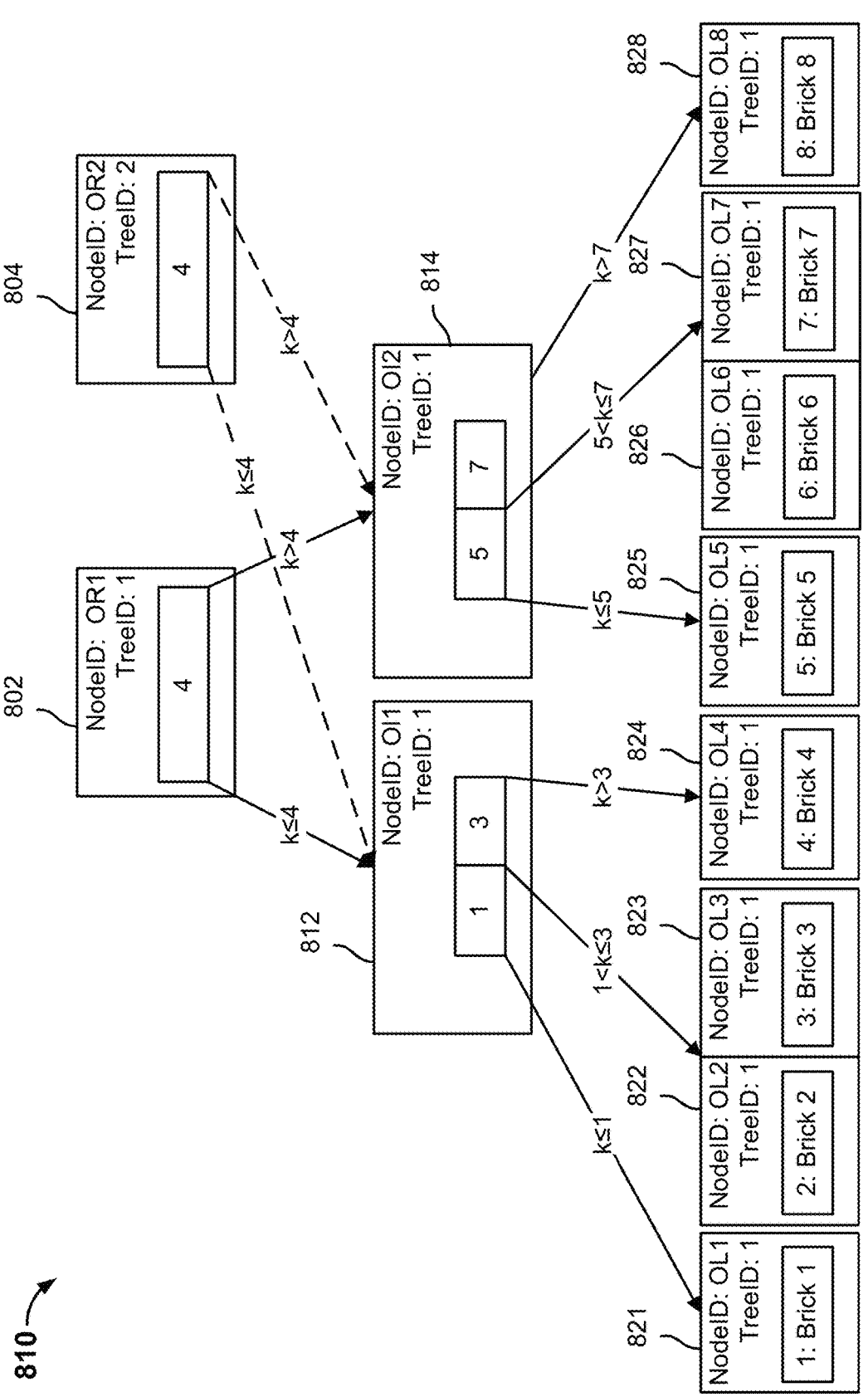
FIG. 8B is a block diagram illustrating an embodiment of a cloned tree data structure.

FIG. 8B is a block diagram illustrating an embodiment of a cloned tree data structure. A metadata structure may be cloned when an incremental data management operation is performed, such as when an incremental backup or an incremental archive of an object is performed. In some embodiments, tree data structure 810 is created by a file system manager, such as file system manager 115 or file system manager 167.

In the example shown, tree data structure 810 corresponds to an object file, but stores metadata associated with the object file. The tree data structure can be used to capture different versions of an object, an object file, or a content file at different moments in time. The metadata structure corresponding to a subsequent version of an object, an object file, a content file may be generated in part by cloning the metadata structure corresponding to a previous version of an object, an object file, or a content file.

A root node or an intermediate node of a version of a metadata structure may reference an intermediate node or a leaf node of a previous version of a metadata structure. Similar to the snapshot tree, the metadata structure allows different versions of an object, an object file, or a content file to share nodes and allows changes to be tracked. When a cohort of data associated with a data management operation is received, a root node of the metadata structure may be linked to one or more intermediate nodes associated with a previous metadata structure. This may occur when data associated with an object, an object file, or a content file is included in a plurality of data management operations.

In the example shown, tree data structure 810 includes a first metadata structure comprising root node 802, intermediate nodes 812, 814, and leaf nodes 821, 822, 823, 824, 825, 826, 827, 828. Tree data structure 810 also includes a second metadata structure that may be a snapshot of object data at a particular point in time, for example at time $t_1$. The second metadata structure is comprised of root node 804, intermediate nodes 812, 814, and leaf nodes 821, 822, 823, 824, 825, 826, 827, 828. To create a snapshot of the object data at time $t_1$, a new root node is created by cloning the previous root node. The cloned root node includes the same set of pointers as the previous root node, but includes a different Node ID and a different Tree ID. In the example shown, root node 804 includes a set of pointers to intermediate nodes 812, 814, which are intermediate nodes associated with a previous snapshot. The Tree ID is the view identifier associated with a view of the metadata structure at a particular moment in time. The Tree ID of a root node indicates a view with which the root node is associated (e.g., content file version). For example, root node 802 with a Tree ID of "1" is associated with a first backup snapshot and root node 804 with a Tree ID of "2" is associated with a second backup snapshot.

In the example shown, root node 804 is a clone (i.e., a copy) of root node 802. Similar to root node 802, root node 804 includes the same pointers as root node 802. Root node 804 includes a first set of pointers to intermediate node 812.

The first set of pointers associated with a data key (e.g., "1," "2," "3," or "4") less than or equal to the node key indicates that traversing a metadata structure included in tree data structure 810 from root node 804 to intermediate node 812 leads to a leaf node with a data key of "1," "2," "3," or "4." Root node 804 includes a second set of pointers to intermediate node 814. The second set of pointers associated with a data key greater than the node key indicates that traversing a metadata structure included in tree data structure 810 from root node 804 to intermediate node 814 leads to a leaf node with a data key of "5," "6," "7," or "8." Root node 804 includes a Node ID of "OR2" and a Tree ID of "2."

Figure 8C:
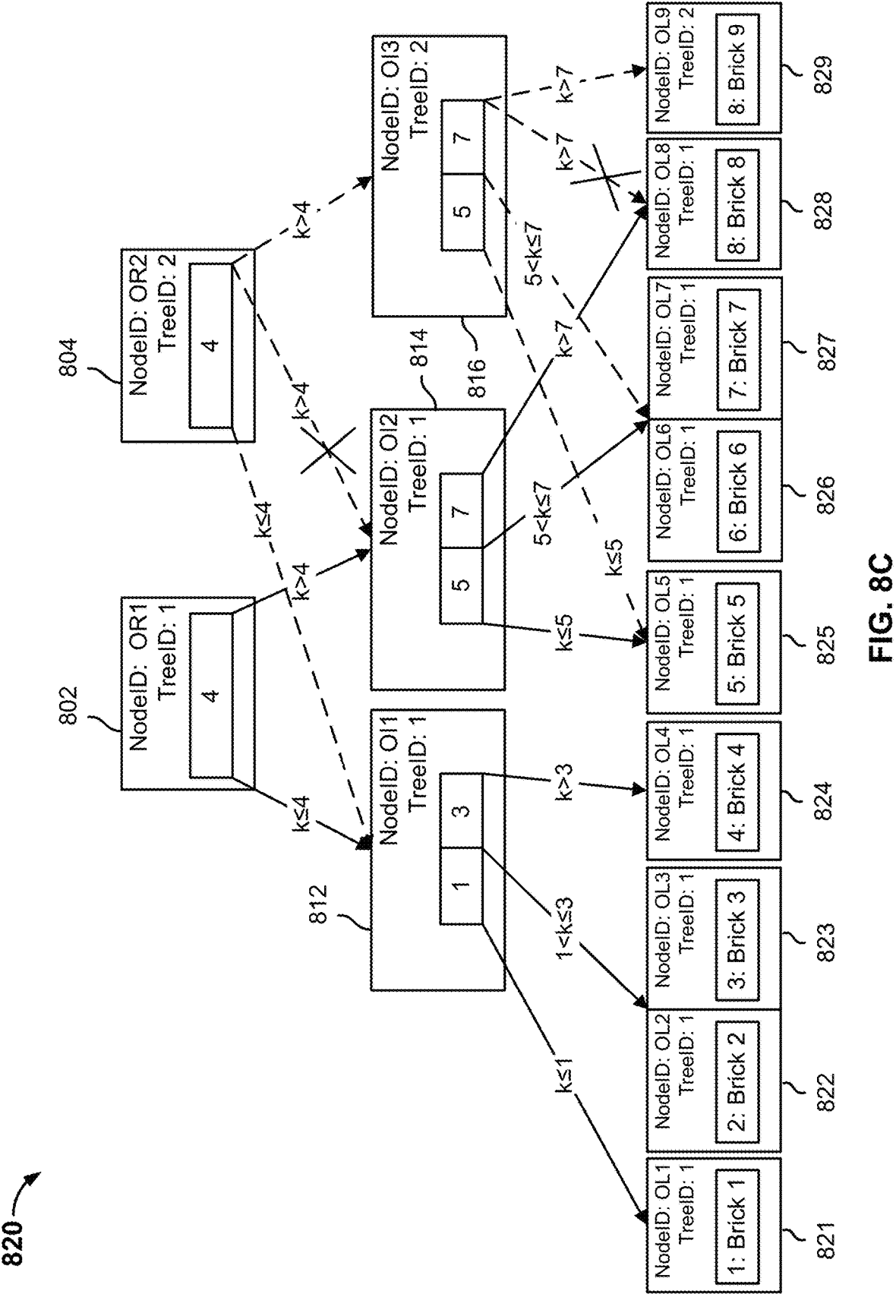
FIG. 8C is a block diagram illustrating an embodiment of modifying a cloned tree data structure.

FIG. 8C is a block diagram illustrating an embodiment of modifying a cloned tree data structure. Tree data structure 820 is comprised of a first metadata structure that includes root node 802 and a second metadata structure that includes root node 804. In the example shown, tree data structure 820 may be modified by a file system manager, such as file system manager 115 or file system manager 167.

In some embodiments, the content data associated with an object file may be modified such that one of the data chunks is replaced by another data chunk. When a data chunk of content data associated with a previous data management operation is replaced with a new data chunk, the data brick associated with the new data chunk may be different. To represent this modification to the object data, a corresponding modification is made to a current view of a metadata structure. The data chunk of the content data that was replaced has a corresponding leaf node in the previous metadata structure. A new leaf node in the current view of the metadata structure is created, as described herein, that corresponds to the new data chunk. The new leaf node includes an identifier associated with the current view. The new leaf node may also store the chunk identifier associated with the modified data chunk.

In the example shown, a data chunk associated with "Brick 8" has been modified. The data chunk associated with "Brick 8" has been replaced with a data chunk associated with "Brick 9." At $t_1$, the file system manager starts at root node 804 because that is the root node associated with the metadata structure at time $t_1$. The value "Brick 8" is associated with the data key "8." The file system manager traverses tree data structure 820 from root node 804 until it reaches a target node, in this example, leaf node 828. The file system manager compares the Tree ID at each intermediate node and leaf node with the Tree ID of the root node. In the event the Tree ID of a node matches the Tree ID of the root node, the file system manager proceeds to the next node. In the event the Tree ID of a node does not match the Tree ID of the root node, a shadow copy of the node with the non-matching Tree ID is made. A shadow copy is a copy of a node and includes the same pointers as the copied node but includes a different Node ID and Tree ID. For example, to reach a leaf node with a data key of "8," the file system manager begins at root node 804 and proceeds to intermediate node 814. The file system manager compares the Tree ID of intermediate node 814 with the Tree ID of root node 804, determines that the Tree ID of intermediate node 814 does not match the Tree ID of root node 804, and creates a copy of intermediate node 814. The intermediate node copy 816 includes the same set of pointers as intermediate node 814 but includes a Tree ID of "2" to match the Tree ID of root node 804. The file system manager updates a pointer of root node 804 to point to intermediate node 816 instead of pointing to intermediate node 814. The file system manager traverses tree data structure 820 from intermediate node 816 to leaf node 828, determines that the Tree ID of leaf node 828 does not match the Tree ID of root node 804, and creates a copy of leaf node 828. Leaf node 829 is a copy of leaf node 828, but stores the brick identifier "Brick 8'" and includes the same Tree ID as root node 804. The file system manager updates a pointer of intermediate node 816 to point to leaf node 829 instead of pointing to leaf node 828.

Figure 8D:
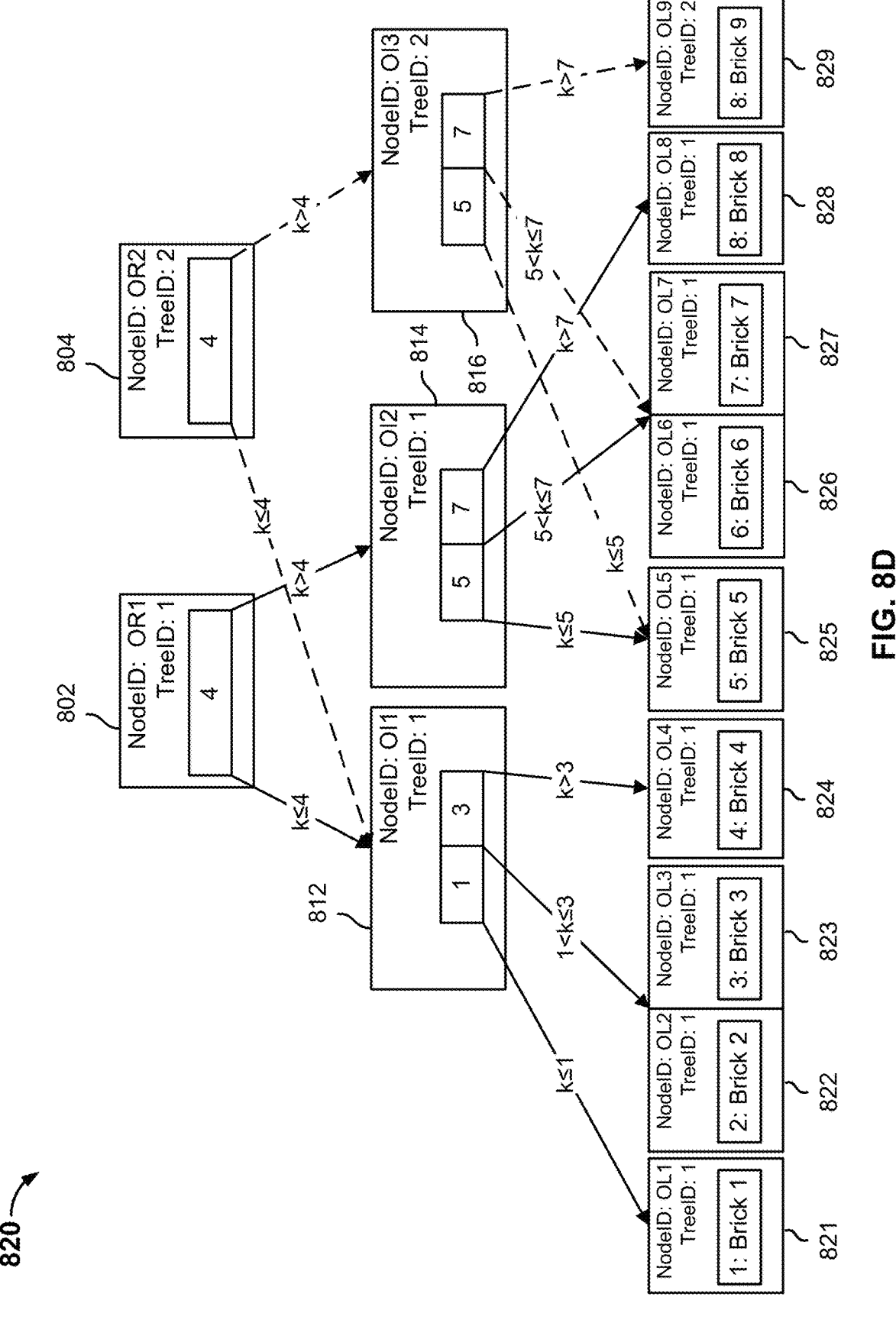
FIG. 8D is a block diagram illustrating an embodiment of a modified tree data structure.

FIG. 8D is a block diagram illustrating an embodiment of a modified tree data structure. The tree data structure 820 shown in FIG. 8D illustrates a result of the modifications made to tree data structure shown in FIG. 8C.

Figure 9A:
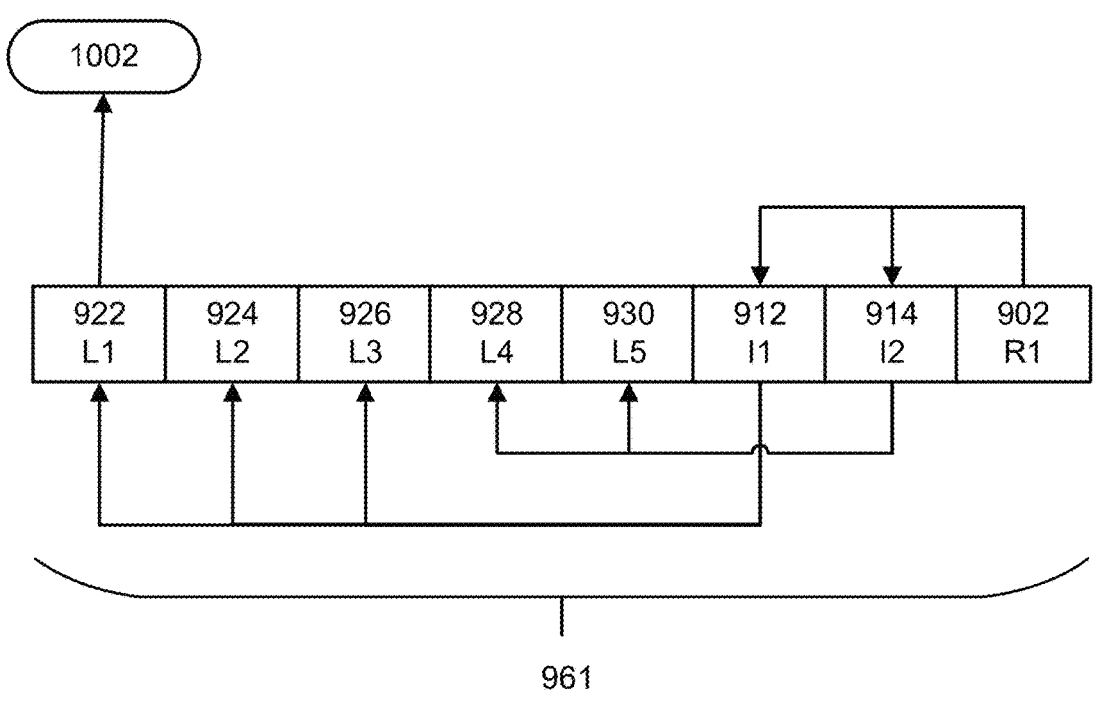
FIG. 9A is a block diagram illustrating a metadata object in accordance with some embodiments.

FIG. 9A is a block diagram illustrating a metadata object in accordance with some embodiments. Metadata object 900 may be generated by an archive manager, such as archive managers 118, 169. A snapshot may be stored locally at a source system, such as source system 103. A snapshot allows the state of a source system to be rolled back to a moment in time for which a snapshot is stored. A source system may store many snapshots (e.g., thousands, millions). Each snapshot may require a significant amount of storage (e.g., GBs, TBs, PBs, etc.). In some instances, it may be desirable to archive a snapshot to a remote storage, such as cloud storage 122. For example, one or more older snapshots may be archived to remote storage location for long-term retention, for data recovery purposes (e.g., other storage systems may access the data associated with a snapshot in the event a storage location that locally stores the snapshot goes offline), to handle spikes in storage demand, and/or to free up local storage for one or more snapshots that include hot data (i.e., data that is accessed frequently).

An archive policy may indicate that a full archive of a snapshot or an incremental archive of the snapshot is to be performed and archived to the remote storage. A full archive includes a complete view of a snapshot at a particular moment in time. An incremental archive provides a complete view of a source system at a particular moment in time, but includes data that was not included in a previous archived to the remove storage. The archive policy may indicate a frequency at which data associated with the source system is archived to remote storage.

As described above, a file system manager may initially generate a snapshot tree and metadata structure(s) to represent a view of a source system at a particular point in time. The file system manager may subsequently serialize the snapshot tree and the metadata structure(s) into corresponding metadata objects that are comprised of a flat set of data. The flat set of data includes a plurality of data blocks where each data block of the flat set of data corresponds to a node of the tree data structure. A data block that corresponds to a root node or intermediate node of the tree data structure includes a file offset to another data block of a flat set of data. A data block that corresponds to a leaf node of a snapshot tree includes a file offset to a data block corresponding to a root node of a metadata structure. A data block that corresponds to a leaf node of a metadata structure includes a reference to a storage location for one or more data chunks with which the leaf node is associated (e.g., a chunk object). A storage of a storage node or a cloud server (e.g., EC2 instance) that stores the metadata may be less reliable and/or more expensive the cloud storage (e.g., S3). The metadata for the one or more data chunks may be serialized and stored at cloud storage to ensure that the metadata for the one or more data chunks is not lost in the event the storage of a storage node or a cloud server fails.

A metadata object corresponding to a full archive includes a root node associated with the view at the particular moment in time (e.g., to), any intermediate nodes associated with the root node, and any leaf nodes associated with the root node. A metadata object corresponding to a full archive does not include a data block corresponding to a node of a previous version of a snapshot tree. An example of a metadata object associated with a full archive is depicted in FIG. 9A. The metadata object 900 includes a flat set of data 961. The flat set of data 961 corresponds to the tree data structure depicted in FIG. 7A.

Tree data structure 700 is an example of a snapshot tree and includes root node 702, intermediate nodes 712, 714, and leaf nodes 722, 724 726, 728, and 730. Metadata object 900 is a serialized version of tree data structure 700. Each data block of flat set of data 961 corresponds to a node of tree data structure 700. A data block may contain a file offset. A file offset represents of pointer of a snapshot tree. A file offset is used in place of pointers because some archive systems cannot store pointers. The file offset may be to another data block of the serialized snapshot tree data. The file offset may be to another data block of a different serialized snapshot tree data.

In the example shown, data blocks 922, 924, 926, 928, 930, 912, 914, and 902 of flat set of data 961 correspond to nodes 722, 724, 726, 728, 730, 712, 714, and 702 of tree data structure 700, respectively. Data block 922 includes a file offset to data block 1002, which corresponds to root node 802 of tree data structure 800.

Figure 9B:
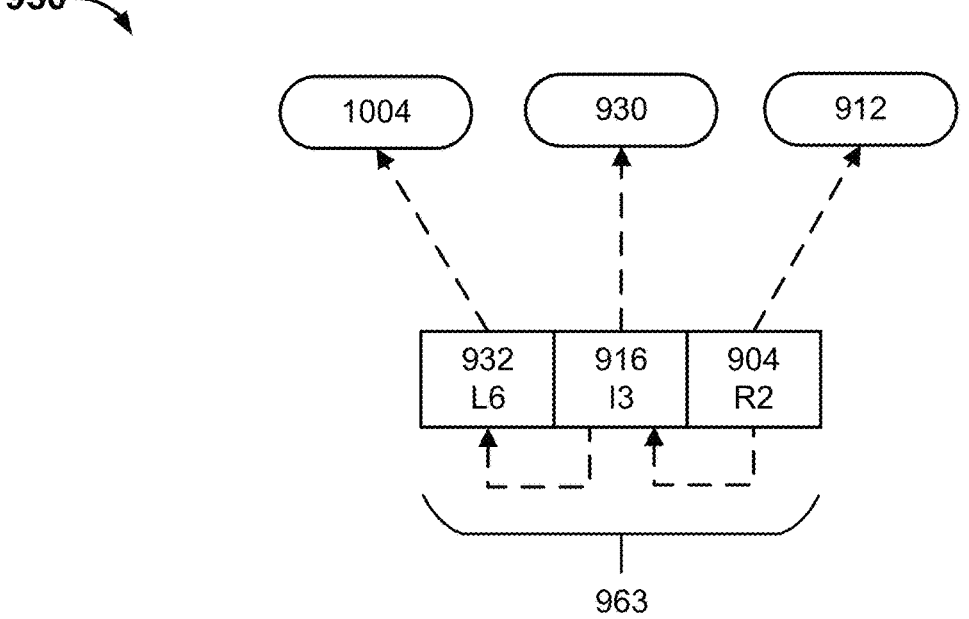
FIG. 9B is a block diagram illustrating a metadata object in accordance with some embodiments.

FIG. 9B is a block diagram illustrating a metadata object in accordance with some embodiments. Metadata object 950 may be generated by an archive manager, such as archive managers 118, 169.

A metadata object corresponding to an incremental archive includes a root node associated with the view at a particular moment in time (e.g., $t_1$), any intermediate nodes associated with the root node, and any leaf nodes associated with the root node, and includes at least one data block that stores a file offset to another data block of a flat set of data associated with a different archive.

In the example shown, metadata object 950 is an example of a metadata object associated with an incremental archive and includes a flat set of data 963. The flat set of data 963 corresponds to the tree data structure depicted in FIG. 7D.

Tree data structure 775 is an example of two snapshot trees that are linked together. The snapshot tree with root node 702 corresponds to a state of a source system at a first point in time $t_0$ and the snapshot tree with root node 704 corresponds to a state of the source system at the second point in time $t_1$. Between $t_0$ and $t_1$, the value associated with data key 6 has changed from "DATA6" to "DATA6'". The snapshot tree with root node 704 includes root node 704, intermediate nodes 712, 716, and leaf nodes 722, 724, 726, 730, 732.

The flat set of data 963 includes data blocks 932, 916, 904. These data blocks correspond to nodes 732, 716, 704 of tree data structure 775. The flat set of data 963 does not include data blocks that correspond to nodes 712, 722, 724, 726, and 730 because data blocks corresponding to those nodes were already stored at the remote storage in the flat set of data 961. Instead of storing duplicate data blocks for theses nodes, the flat set of data 963 includes file offsets to data blocks included in the flat set of data 961. Data block 904 stores a file offset to data block 912 because root node 704 stores a pointer to intermediate node 712. Data block 916 stores a file offset to data block 930 because intermediate node 716 stores a pointer to leaf node 730. Data block 932 includes a file offset to block 1004, which corresponds to root node 804 of tree data structure 820.

Figure 10A:
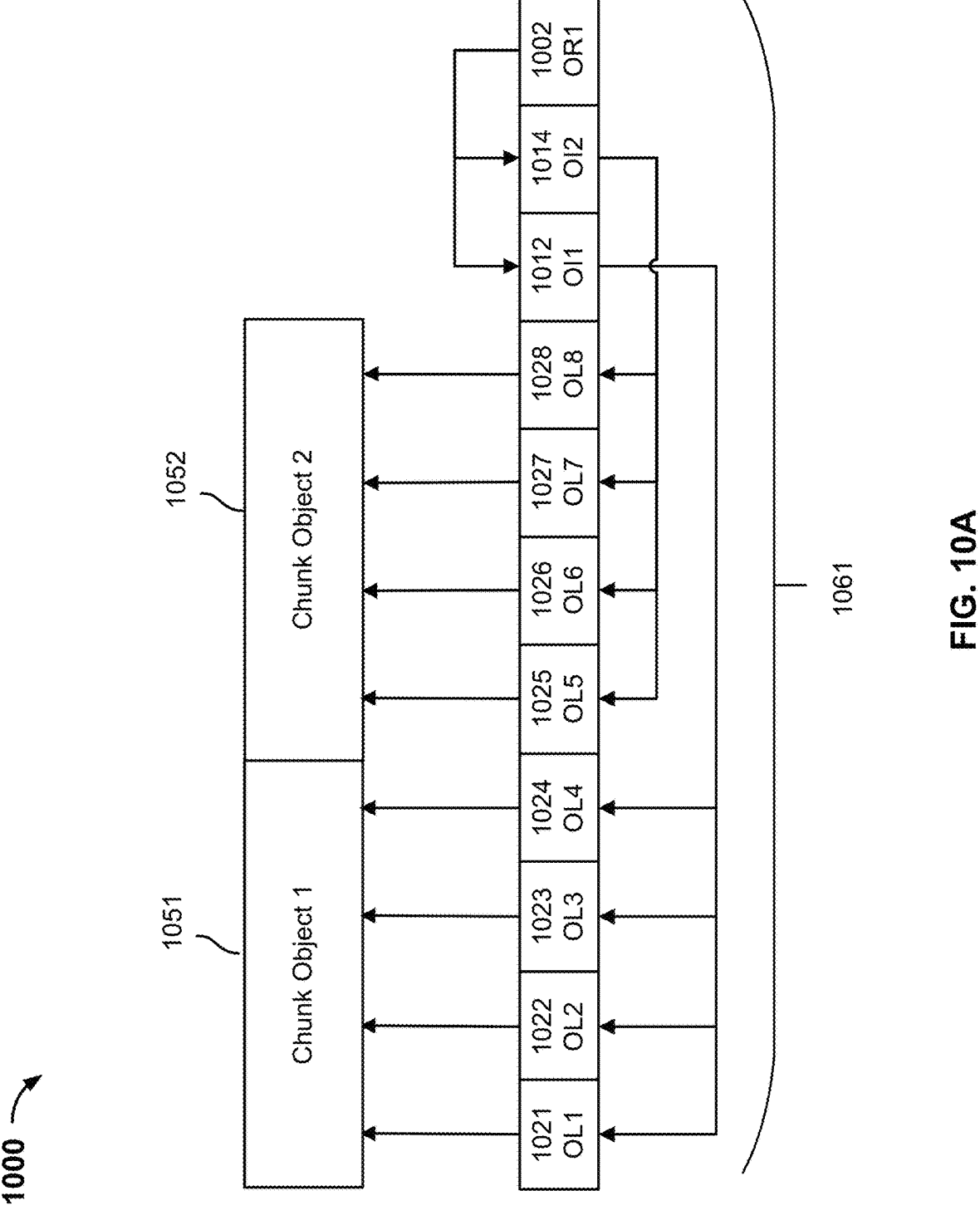
FIG. 10A is a block diagram illustrating a metadata object in accordance with some embodiments.

FIG. 10A is a block diagram illustrating a metadata object in accordance with some embodiments. Metadata object 1000 may be generated by an archive manager, such as archive managers 118, 169.

In the example shown, metadata object 1000 corresponds to a full archive of an object stored at a source system at a particular point in time $t_0$. The flat set of data 1061 corresponds to the tree data structure depicted in FIG. 8A.

Metadata structure 800 provides a view of the object stored at the source system at $t_0$. Metadata object includes root node 802, intermediate nodes 812, 814, and leaf nodes 821, 822, 823, 824, 825, 826, 827, 828. Each of the leaf nodes store corresponding data brick identifiers.

Metadata object 1000 is a serialized version of metadata structure 800. Each block of the flat set of data 1061 corresponds to a node of tree data structure 800. Data blocks 1021, 1022, 1023, 1024, 1025, 1026, 1027, 1028, 1012, 1014, and 1002 correspond to nodes 821, 822, 823, 824, 825, 826, 827, 828, 812, 814, and 802, respectively. Data blocks 1021, 1022, 1023, 1024 store corresponding chunk offsets of data chunks stored in chunk object 1051. Data blocks 1025, 1026, 1027, 1028 store corresponding chunk object offsets for data chunks in chunk object 1052.

Figure 10B:
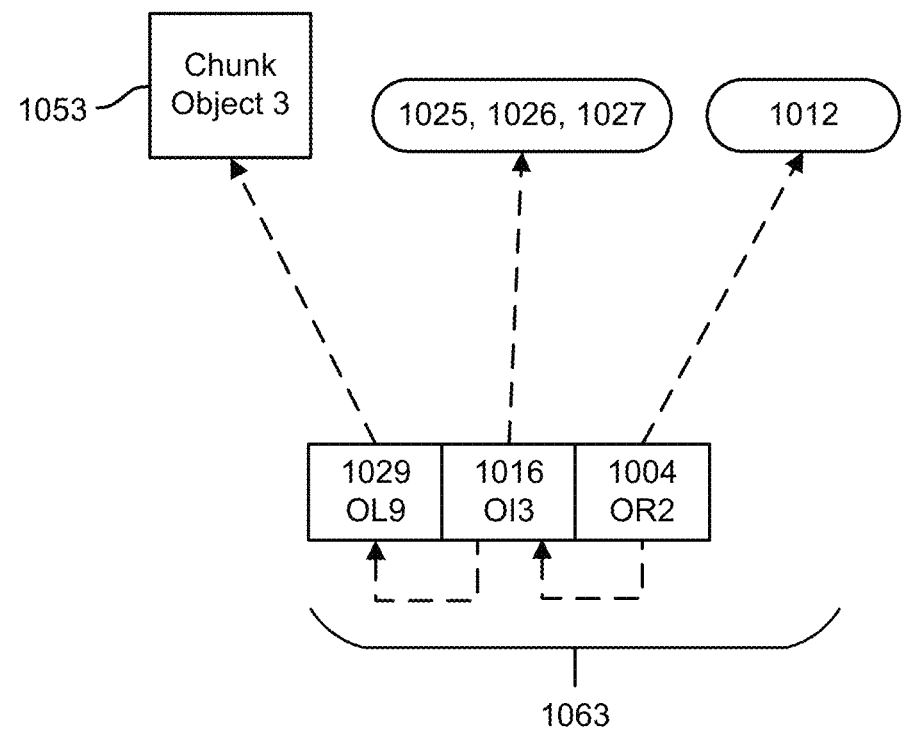
FIG. 10B is a block diagram illustrating a metadata object in accordance with some embodiments.

FIG. 10B is a block diagram illustrating a metadata object in accordance with some embodiments. Metadata object 1050 may be generated by an archive manager, such as archive managers 118, 169.

In the example shown, metadata object 1050 corresponds to an incremental of an object stored at a source system at a particular point in time $t_1$. The flat set of data 1063 corresponds to the tree data structure depicted in FIG. 8D.

Tree data structure 820 is an example of two metadata structures that are linked together. The metadata structure with root node 802 corresponds to a state of an object stored at a source system at a first point in time $t_0$ and the metadata structure with root node 804 corresponds to a state of an object stored at the source system at the second point in time $t_1$. Between $t_0$ and $t_1$, the value associated with data key 8 has changed from "Brick 8" to "Brick 9". The metadata structure with root node 804 includes root node 804, intermediate nodes 812, 816, and leaf nodes 821, 822, 823, 824, 825, 826, 827, 829.

The flat set of data 1063 includes data blocks 1029, 1016, 1004. These data blocks correspond to nodes 829, 816, 804 of tree data structure 820. The flat set of data 1063 does not include data blocks that correspond to nodes 812, 821, 822, 823, 824, 825, 826, and 827 because data blocks corresponding to those nodes were already stored at the remote storage in the flat set of data 1061. Instead of storing duplicate data blocks for theses nodes, the flat set of data 1063 includes file offsets to data blocks included in the flat set of data 1061. Data block 1004 stores a file offset to data block 1012 because root node 804 stores a pointer to intermediate node 812. Data block 1016 stores file offsets to data blocks 1025, 1026, and 1027 because intermediate node 816 stores pointers to leaf node 825, 826, and 827. Block 1029 includes a chunk offset for a data chunk stored in chunk object 1053.

Figure 11:
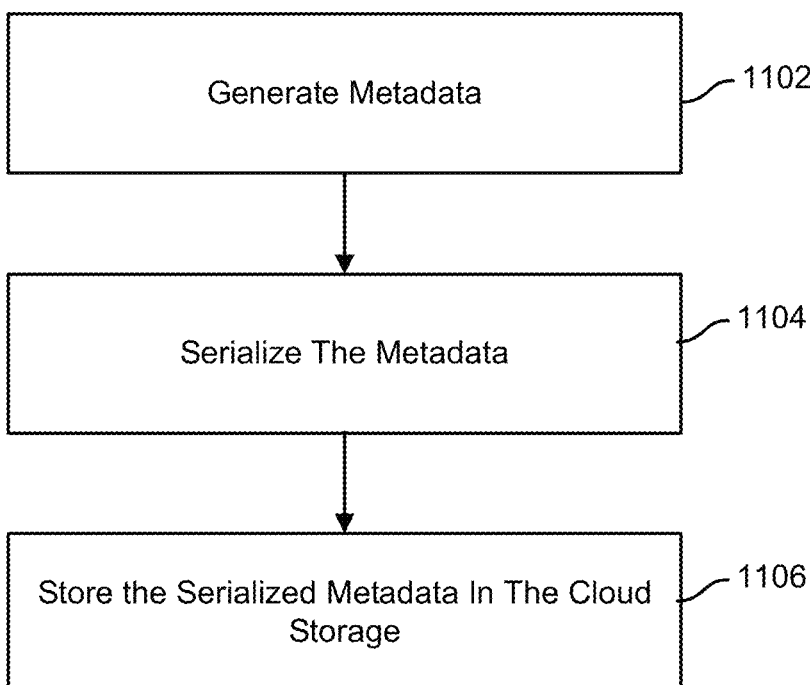
FIG. 11 is a flow diagram illustrating a process for generating metadata objects in accordance with some embodiments.

FIG. 11 is a flow diagram illustrating a process for generating metadata objects in accordance with some embodiments. In the example shown, process 1100 may be implemented by a cloud server, such as one of the one or more cloud servers 113. In some embodiments, process 1100 may be implemented by a storage system, such as storage system 105.

At 1102, metadata is generated for data that is to be archived to a remote storage. A file system manager is configured to generate metadata (e.g., tree data structures, chunk metadata data structure, chunk object metadata data structure, archive metadata) that enables the one or more data chunks that were written to cloud storage to be located and provides a view (partial or complete) of the source system at a particular moment in time.

At 1104, the generated metadata is serialized into a data file comprising a flat set of data. The flat set of data includes a plurality of data blocks where each data block of the flat set of data corresponds to a node of the tree data structure.

At 1106, the serialized metadata is stored in the cloud storage. The generated metadata for the one or more data chunks may be serialized and stored at cloud storage to ensure that the metadata for the one or more data chunks is not lost in the event the storage of a storage node or a cloud server fails.

Steps 1104 and 1106 may be periodically (e.g., daily, weekly, bi-monthly, monthly, etc.) performed. In some embodiments, steps 1104 and 1106 are performed after a particular amount of time has passed after an archive has completed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
determining, by a computing system, based at least in part on a second data management policy associated with a second archive, an expiration time for one or more objects included in a first archive associated with a first data management policy;

storing, by the computing system, the first archive to a remote storage, wherein at least a portion of the first archive references data chunks stored in a chunk object of the remote storage;

determining, by the computing system, whether the first archive is subject to a data lock period;

before extending the expiration time for the one or more objects included in the first archive, determining, by the computing system, whether to extend the expiration time for the one or more objects included in the first archive based at least in part on a rate of change between the first and second archives;

extending, by the computing system, the expiration time for the one or more objects included in the first archive in response to a determination that the first archive is subject to the data lock period;

determining, by the computing system, the first archive has expired; and performing, by the computing system, according to the expiration time for the one or more objects included in the first archive, based on determining the first archive has expired and none of one or more objects included in the second archive reference the data chunks stored in the chunk object, garbage collection of the chunk object of the remote storage.

2. The method of claim 1, wherein determining the expiration time for the one or more objects included in the first archive comprises applying, by the computing system, a machine learning model to determine the expiration time for the one or more objects included in the first archive.

3. The method of claim 1, wherein the second archive comprises an incremental archive of the first archive.

4. The method of claim 1, wherein determining whether to extend the expiration time for the one or more objects included in the first archive comprises determining, by the computing system, whether to extend the expiration time for the one or more objects included in the first archive using a machine learning model.

5. The method of claim 1, further comprising storing, by the computing system, the expiration time in an archive metadata object associated with the first archive, wherein determining the first archive has expired is based on the expiration time stored in the archive metadata object associated with the first archive.

6. A computing system comprising:
non-transitory computer-readable storage media storing instructions; and
processing circuitry that executes the instructions to:
determine, based at least in part on a second data management policy associated with a second archive, an expiration time for one or more objects included in a first archive associated with a first data management policy;

store the first archive to a remote storage, wherein at least a portion of the first archive references data chunks stored in a chunk object of the remote storage;

determine whether the first archive is subject to a data lock period;

before extending the expiration time for the one or more objects included in the first archive, determine whether to extend the expiration time for the one or more objects included in the first archive based at least in part on a rate of change between the first and second archives;

extend the expiration time for the one or more objects included in the first archive in response to a determination that the first archive is subject to the data lock period;

determine the first archive has expired; and perform, according to the expiration time for the one or more objects included in the first archive, based on determining the first archive has expired and none of one or more objects included in the second archive reference the data chunks stored in the chunk object, garbage collection of the chunk object of the remote storage.

7. The computing system of claim 6, wherein to determine the expiration time for the one or more objects included in the first archive the processing circuitry that executes the instructions to apply a machine learning model to determine the expiration time for the one or more objects included in the first archive.

8. The computing system of claim 6, wherein the second archive comprises an incremental archive of the first archive.

9. The computing system of claim 6, wherein the processing circuitry executes the instructions to, before extending the expiration time for the one or more objects included in the first archive, determine, whether to extend the expiration time for the one or more objects included in the first archive using a machine learning model.

10. The computing system of claim 6, wherein the processing circuitry executes the instructions to store the expiration time in an archive metadata object associated with the first archive, wherein determining the first archive has expired is based on the expiration time stored in the archive metadata object associated with the first archive.

11. Non-transitory computer-readable storage media comprising instructions that, when executed, cause processing circuitry of a computing system to:

determine, based at least in part on a second data management policy associated with a second archive, an expiration time for one or more objects included in a first archive associated with a first data management policy;

store the first archive to a remote storage, wherein at least a portion of the first archive references data chunks stored in a chunk object of the remote storage;

determine whether the first archive is subject to a data lock period;

before extending the expiration time for the one or more objects included in the first archive, determine whether to extend the expiration time for the one or more objects included in the first archive based at least in part on a rate of change between the first and second archives;

extend the expiration time for the one or more objects included in the first archive in response to a determination that the first archive is subject to the data lock period;

determine the first archive has expired; and perform, according to the expiration time for the one or more objects included in the first archive, based on determining the first archive has expired and none of one or more objects included in the second archive reference the data chunks stored in the chunk object, garbage collection of the chunk object of the remote storage.

12. The non-transitory computer-readable storage media of claim 11, wherein to determine the expiration time for the one or more objects included in the first archive the instructions, when executed, cause processing circuitry to apply a machine learning model to determine the expiration time for the one or more objects included in the first archive.

* * * * *